(12) United States Patent
Chen et al.

(10) Patent No.: US 12,177,475 B2
(45) Date of Patent: Dec. 24, 2024

(54) MODEL-BASED MOTION VECTOR DIFFERENCE DERIVATION AND TEMPLATE MATCHING PREDICTION FOR VIDEO CODING

(71) Applicant: QUALCOMM Incorporated, San Diego, CA (US)

(72) Inventors: Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/586,492

(22) Filed: Jan. 27, 2022

(65) Prior Publication Data

US 2022/0248047 A1 Aug. 4, 2022

Related U.S. Application Data

(60) Provisional application No. 63/143,585, filed on Jan. 29, 2021.

(51) Int. Cl.
 *H04N 19/523* (2014.01)
 *H04N 19/105* (2014.01)
 (Continued)

(52) U.S. Cl.
 CPC ........ *H04N 19/523* (2014.11); *H04N 19/105* (2014.11); *H04N 19/139* (2014.11); *H04N 19/176* (2014.11); *H04N 19/513* (2014.11)

(58) Field of Classification Search
 None
 See application file for complete search history.

(56) References Cited

U.S. PATENT DOCUMENTS 11,240,531 B2 * 2/2022 Liu ............... H04N 19/577
11,317,085 B2 * 4/2022 Xiu ............... H04N 19/583
(Continued)

OTHER PUBLICATIONS

Du C., et al., "PPHPS: A Parabolic Prediction-Based, Fast Half-Pixel Search Algorithm for Very Low Bit-Rate Moving-Picture Coding", IEEE Transactions on Circuits and Systems for Video Technology, IEEE, USA, vol. 13, No. 6, Jun. 1, 2003 (Jun. 1, 2003), XP011071958, 5 Pages, ISSN: 1051-8215, The Whole Document.
(Continued)

*Primary Examiner* — Chikaodili E Anyikire
(74) *Attorney, Agent, or Firm* — Shumaker & Sieffert, P. A.

(57) ABSTRACT

An example device for decoding video data includes a memory configured to store video data; and one or more processors configured to: decode data representing an initial motion vector for a current block of the video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

27 Claims, 15 Drawing Sheets

(51) Int. Cl.
  *H04N 19/139* (2014.01)
  *H04N 19/176* (2014.01)
  *H04N 19/513* (2014.01)

(56) References Cited

U.S. PATENT DOCUMENTS

| | | | |
|---|---|---|---|
| 11,575,925 B2* | 2/2023 | Lee | H04N 19/52 |
| 2018/0091816 A1* | 3/2018 | Chien | H04N 19/52 |
| 2018/0278949 A1* | 9/2018 | Karczewicz | H04N 19/44 |
| 2020/0236389 A1* | 7/2020 | Esenlik | H04N 19/57 |
| 2020/0280735 A1* | 9/2020 | Lim | H04N 19/523 |
| 2022/0210438 A1* | 6/2022 | Chen | H04N 19/139 |
| 2022/0295088 A1* | 9/2022 | Zhang | H04N 19/105 |

OTHER PUBLICATIONS

Esenlik (Huawei) S., et al., "Description of Core Experiment 9 (CE9): Decoder Side Motion Vector Derivation", 122. MPEG Meeting, Apr. 16, 2018-Apr. 20, 2018, San Diego, (Motion Picture Expert Group or ISO/IEC JTC1/SC29/WG11), No. m42832, Apr. 27, 2018 (Apr. 27, 2018), XP030262066, 35 Pages, Retrieved from the Internet: URL: http://phenix.int-evry.fr/mpeg/doc_end_user/documents/122_San%20Diego/wg11/m42832-JVET-J1029-v2-JVET-J1029_r1.zip JVET-J1029_r1.doc [Retrieved on Apr. 27, 2018].

International Search Report and Written Opinion—PCT/US2022/014280—ISA/EPO—May 10, 2022, 16 pp.

Sethuraman (Ittiam) S., "CE9: Results of DMVR Related Tests CE9.2.1 and CE9.2.2", 13. JVET Meeting, Jan. 9, 2019-Jan. 18, 2019, Marrakech, (The Joint Video Exploration Team of ISO/IEC JTC1/SC29/WG11 and ITU-T SG.16 ), No. JVET-M0147, Jan. 4, 2019 (Jan. 4, 2019), XP030200610, 9 Pages, Retrieved from the Internet: URL: http://phenix.int-evry.fr/jvet/doc_end_user/documents/13_Marrakech/wg11/JVET-M0147-v2.zip JVET-M0147-v2.docx [Retrieved on Jan. 4, 2019].

Sethuraman (Ittiam) S., et al., "Decoder Side MV Refinement/Derivation with CTB-level Concurrency and Other Normative Complexity Reduction Techniques", 11. JVET Meeting, Jul. 11, 2018-Jul. 18, 2018, Ljubjana, (The Joint Video Exploration Team of ISO/IEC JTC1/SC29/WG11 and ITU-TSG.16 ), No. JVET-K0041, Jul. 14, 2018 (Jul. 14, 2018), XP030199706, 18 Pages, Retrieved from the Internet: URL: http://phenix.int-evry.fr/jvet/doc_end_user/documents/11_Ljubljana/wg11/JVET-K0041-v2.zip JVET-K0041-v2.pptx. [Retrieved on Jul. 14, 2018].

Bross, B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Sep. 4, 2020 (Sep. 4, 2020), XP030293002, 551 Pages, Retrieved from the Internet: URL: https://dms.mpeg.expert/doc_enq_user/documents/131_Teleconference/wg11/mS4716-JVET-S2001-v17-JVET-S2001-vH.zip.

Bross B., et al., "Versatile Video Coding (Draft 9)," 130th MPEG Meeting, 18th JVET Meeting, Apr. 15, 2020-Apr. 24, 2020, Alpbach, (Motion Picture Expert Group or ISO/IEC JTC1/SC29/WG11 and JVET of ITU-T SG 16 WP 3 and ISO/IEC JTC 1/SC 29/WG 11), No. m53983, JVET-R2001-v8, May 6, 2020 (May 6, 2020), XP030287934, 524 pages, Retrieved from the Internet: URL: http://phenix.int-evry.fr/mpeg/doc_end_user/documents/130_Alpbach/wg11/m53983-JVET-R2001-v8-JVET-R2001-v8.zip.

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by Teleconference, Oct. 7-16, 2020, pp. 1-515.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Sethuraman S., et al., "Decoder Side MV Refinement/Derivation with CTB-Level Concurrency and Other Normative Complexity Reduction Techniques", Joint Video Experts Team (JVET) of ITU-T SG 16 WP 3 and ISO/IEC JTC 1/SC 29/WG 11th Meeting: Ljubljana, SI, Jul. 10-18, 2018, JVET-K0041-v2, Jul. 10-18, 2018, pp. 1-9.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191, http://dx.doi.org/10.1109/TCSVT.2012.2221191, https://ieeexplore.ieee.org/stamp/stamp.jsp?%20arnumber=6316136).

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

U.S. Appl. No. 17/558,119, filed Dec. 21, 2021, by Chen et al.

* cited by examiner

MODEL-BASED MOTION VECTOR DIFFERENCE DERIVATION AND TEMPLATE MATCHING PREDICTION FOR VIDEO CODING

This application claims the benefit of U.S. Provisional Application No. 63/143,585, filed Jan. 29, 2021, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaining devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for decoder-side motion vector derivation (DMVD). A video coder (such as a video encoder and/or a video decoder) may be configured to perform DVMD using one or more various techniques, such as template matching, bilateral prediction, decoder-side motion vector refinement, or the like. These techniques may be applied to existing video codecs, such as HEVC (High Efficiency Video Coding), VVC (Versatile Video Coding), Essential Video Coding (EVC), or other existing codecs/video coding standards. These techniques may also be implemented in future video coding standards/codecs.

In one example, a method of decoding video data includes determining an initial motion vector for a current block of video data, the initial motion vector having integer-motion vector difference (MVD) precision; determining a search range around a reference area identified by the initial motion vector in a reference picture; performing a template matching search process in the search range to identify a best matching region; determining error values for neighboring pixels to the best matching region; using the error values for the neighboring pixels to perform a model-based fractional-pixel motion vector refinement to derive motion vector difference values; applying at least one of the motion vector difference values to the initial motion vector to determine a refined motion vector for the current block; and decoding the current block using the refined motion vector.

In another example, a device for decoding video data includes a memory configured to store video data; and one or more processors implemented in circuitry and configured to: determine an initial motion vector for a current block of the video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

In another example, a computer-readable storage medium has stored thereon instructions that, when executed, cause a processor of a device for decoding video data to: determine an initial motion vector for a current block of video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

In another example, a device for decoding video data includes means for determining an initial motion vector for a current block of video data, the initial motion vector having integer-motion vector difference (MVD) precision; means for determining a search range around a reference area identified by the initial motion vector in a reference picture; means for performing a template matching search process in the search range to identify a best matching region; means for determining error values for neighboring pixels to the best matching region; means for using the error values for the neighboring pixels to perform a model-based fractional-pixel motion vector refinement to derive motion vector difference values; means for applying at least one of the motion vector difference values to the initial motion vector to determine a refined motion vector for the current block; and means for decoding the current block using the refined motion vector.

The details of one or more examples are set forth in the accompanying drawings and the description below. Other features, objects, and advantages will be apparent from the description, drawings, and claims.

DETAILED DESCRIPTION

Figure 1:
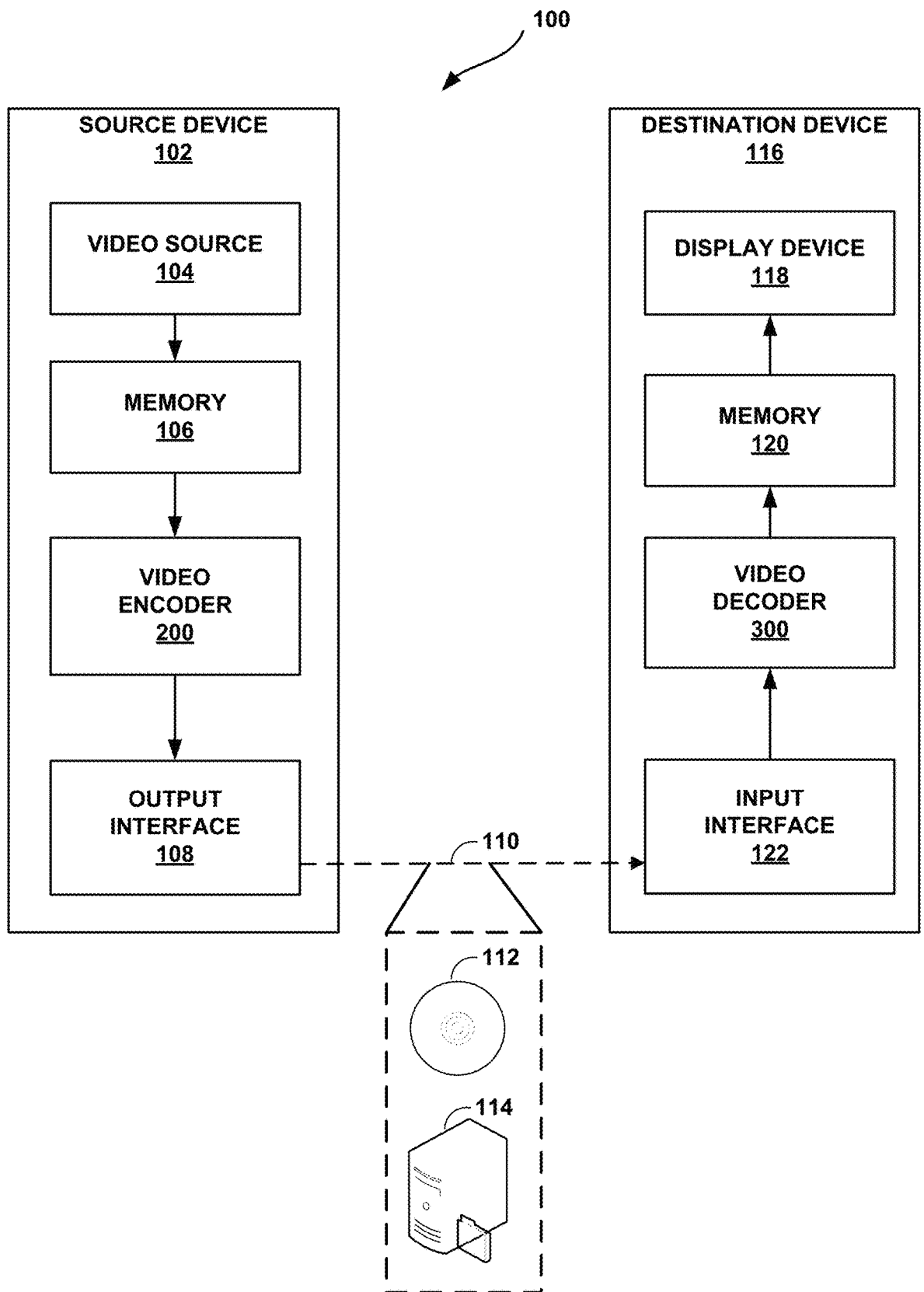
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents differences between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to decoder-side motion vector derivation (DMVD) techniques, such as template matching, bilateral matching, and decoder-side MV refinement. Although these techniques are referred to as being performed at the decoder-side, it should be understood that the decoder-side motion vector derivation techniques described herein may also be performed by a video encoder, e.g., to determine how to encode a block of video data and to store reference data that will be the same as decoded reference data available to the video decoder. The techniques of this disclosure may be applied to any of the existing video codecs, such as High Efficiency Video Coding (HEVC), Versatile Video Coding (VVC), Essential Video Coding (EVC), or be an efficient coding tool in future video coding standards.

The various techniques of this disclosure may improve the performance of video codecs (encoders and decoders) and reduce Nitrate of coded video data. In general, techniques of this disclosure include refining an initial motion vector for a current block of video data using DMVD, where the initial motion vector has integer precision. That is, the initial motion vector points to a full integer pixel position as opposed to a fractional pixel position. Refinement of the initial motion vector may result in a refined motion vector having fractional pixel precision. The initial motion vector may be coded in a bitstream, such that fewer bits are needed to represent the initial motion vector in the bitstream (as opposed to more bits being needed for a motion vector having fractional pixel precision). Furthermore, encoding and decoding a full-integer precision motion vector may take fewer processing operations than encoding and decoding a motion vector having fractional pixel precision.

However, by refining the motion vector to potentially have fractional pixel precision, the refined motion vector may have greater precision and thus, more accurately identify a prediction block for the current block. As a result, a residual for the current block may be reduced, thereby further reducing the Nitrate for the bitstream, as well as encoding and decoding operations required to encode or decode the residual data. As such, these techniques may improve both operation of an encoder and a decoder and reduce the Nitrate for a bitstream including data representing a coded video sequence.

Moreover, performing DMVD using integer pixel precision reduces the burden on encoders and decoders relative to performing DMVD using fractional pixel precision. In particular, to perform DMVD, the encoder or decoder performs a search in an area around the area identified by the initial motion vector. When the initial motion vector has integer pixel precision, decoded pixels in the area can be used directly. By contrast, if the initial motion vector had sub-integer pixel precision (i.e., fractional pixel precision), sub-integer pixel values would need to be interpolated, thereby increasing processing and memory consumption demands placed on the encoder and decoder.

Video coding standards include ITU-TH.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). An HEVC draft specification, referred to as HEVC WD hereinafter, is available from phenix.int-evry.fr/jct/doc_end_user/documents/14_Vienna/wg11/JCTVC-N1003-v1.zip.

ITU-T VCEG (Q6/16) and ISO/ITC MPEG (JTC 1/SC 29/WG 11) are studying future video coding technology with a compression capability that significantly exceeds that of the HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The latest version of reference software, i.e., VVC Test Model 11.2 (VTM 11.2) is available from vcgit.hhi.fraunhofer.de/jvet/VVCSoftware_VTM. The Versatile Video Coding (VVC) draft specification is referred to as Document JVET-T2001. An algorithm description of Versatile Video Coding and Test Model 11 (VIM 11.0) is referred to as Document JVET-T2002.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for model-based motion vector difference derivation and template matching prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for model-based motion vector difference derivation and template matching prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, encoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive. Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions. Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting, 15-24 April, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MIT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MIT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. The component may be an array or single sample from one of three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile, A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture, To perform inter-prediction, video encoder 200 may generate the prediction block using one or more motion vectors. Video encoder 200 may generally perform a motion search to identify a reference block that closely matches the CU, e.g, in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an in-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
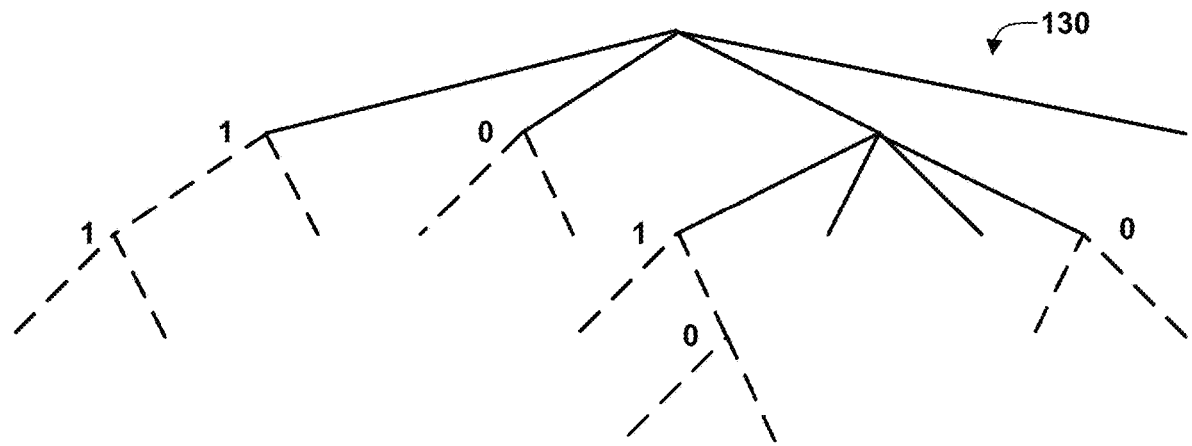
FIGS. 2A and 2B are conceptual diagrams illustrating an example quadtree binary tree (QTBT) structure, and a corresponding coding tree unit (CTU).
Figure 2B:
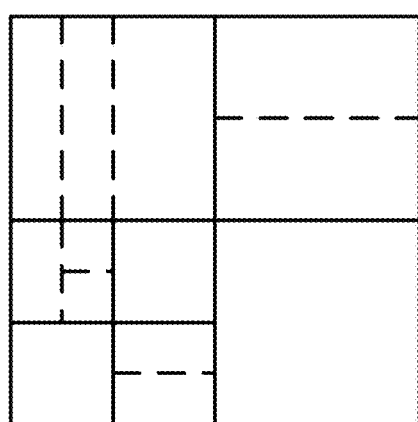

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBIDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size), if the quadtree leaf node is 128×128, the quadtree leaf node will not be further split by the binary tree, since the size exceeds the MaxBTSize (i.e., 64×64, in this example). Otherwise, the quadtree leaf node may be further partitioned by the binary tree. Therefore, the quadtree leaf node is also the root node for the binary tree and has the binary tree depth as 0. When the binary tree depth reaches MaxBIDepth (4, in this example), no further splitting is permitted. A binary tree node having a width equal to MinBTSize (4, in this example) it implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

In HEVC, the largest coding unit in a slice is CTB, also called a CTU. A CTB contains a quad-tree, the nodes of which are CUs. The size of a CTB can range from 16×16 to 64×64 in the HEVC main profile (although technically 8×8 CTB sizes can be supported). A CU may be the same size as a CTB to as small as 8×8. Each CU is coded with one coding mode, e.g., inter or intra. When a CU is inter coded, the CU may be further partitioned into 2 or 4 PUs or become just one PU when further partitioning does not apply. When two PUs are present in one CU the two PUs can be half size rectangles or two rectangles with sizes of ¼ or ¾ the size of the CU.

Figure 3B:
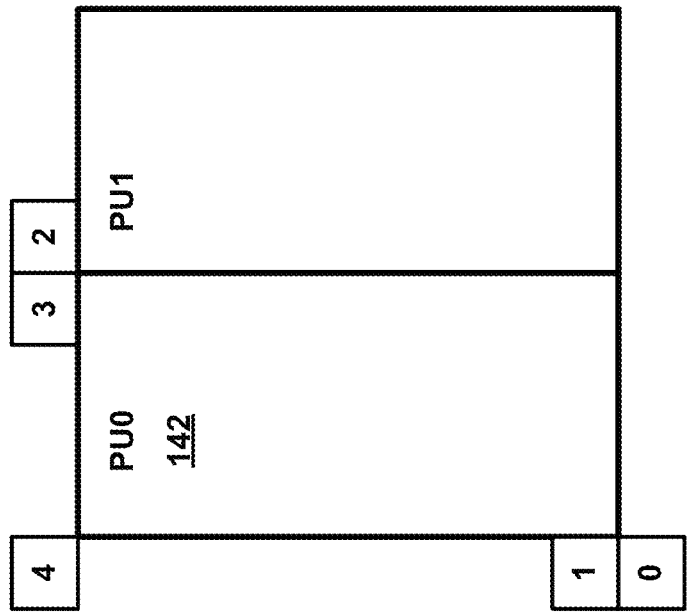
FIGS. 3A and 3B are conceptual diagrams illustrating spatial neighboring motion vector candidates for merge mode and advanced motion vector prediction (AMVP).
Figure 3A:
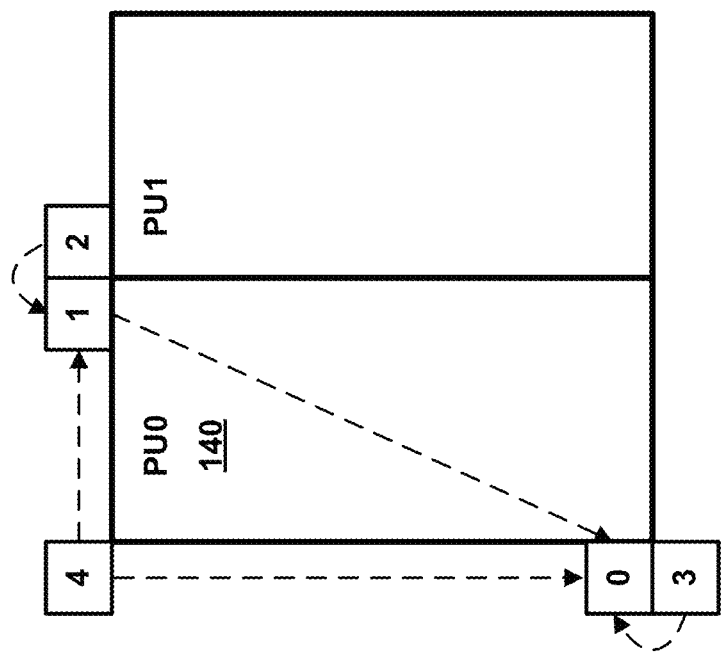

FIGS. 3A and 3B are conceptual diagrams illustrating spatial neighboring motion vector candidates for merge mode and advanced motion vector prediction (AMVP). When a CU is inter coded, each PU has one set of motion information, which is derived with a unique inter prediction mode. In the HEVC standard, there are two inter prediction modes, named merge (skip is considered as a special case of merge) and advanced motion vector prediction (AMVP) modes, respectively, for a PU.

In either AMVP or merge mode, video encoder 200 and video decoder 300 may be configured to maintain a motion vector (MV) candidate list for multiple motion vector predictors. Video encoder 200 and video decoder 300 may be configured to generate the motion vector(s), as well as reference indices in the merge mode, of the current PU by taking one candidate from the MV candidate list.

In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, video encoder 200 and video decoder 300 may be configured to determine the reference pictures used for the prediction of the current blocks, as well as the associated motion vectors. On the other hand, under AMVP mode for each potential prediction direction from either list 0 or list 1, a reference index is explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

FIGS. 3A and 3B are conceptual diagrams illustrating spatial neighboring motion vector candidates for merge mode and advanced motion vector prediction (AMVP). Spatial MV candidates are derived from the neighboring blocks (shown in FIG. 3A and FIG. 3B) for a specific PU (PU0), although the processes for generating the candidates from the blocks differ for merge and AMVP modes.

In merge mode, up to four spatial MV candidates can be derived for PU0 140 with the order shown in FIG. 3A. The order is as follows—left (0), above (1), above right (2), below left (3), and above left (4).

In AVMP mode, the neighboring blocks of block PU0 142 are divided into two groups: a left group including block 0 and 1, and an above group including blocks 2, 3, and 4, as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate, thus the temporal distance differences can be compensated.

Figure 4B:
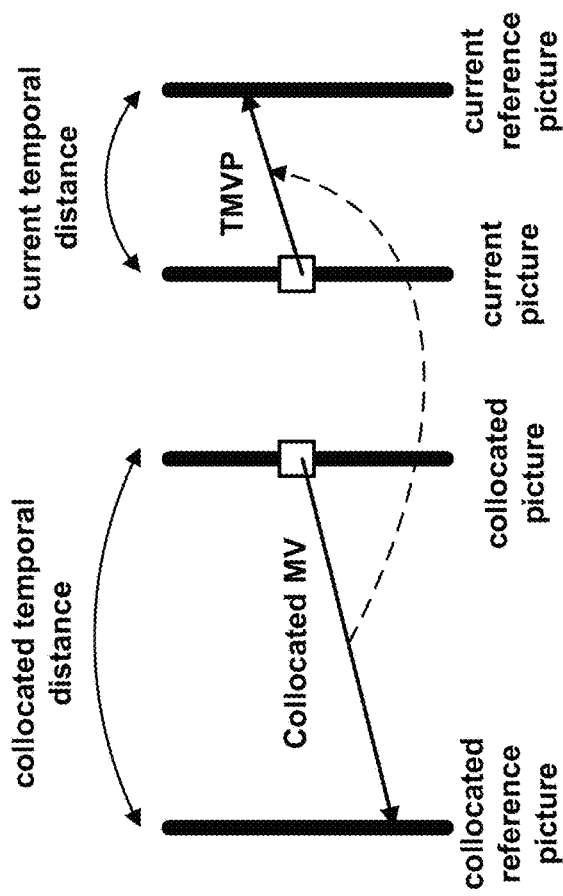
FIGS. 4A and 4B are conceptual diagrams illustrating temporal motion vector prediction (TMVP) candidates and motion vector scaling for TMVP.
Figure 4A:
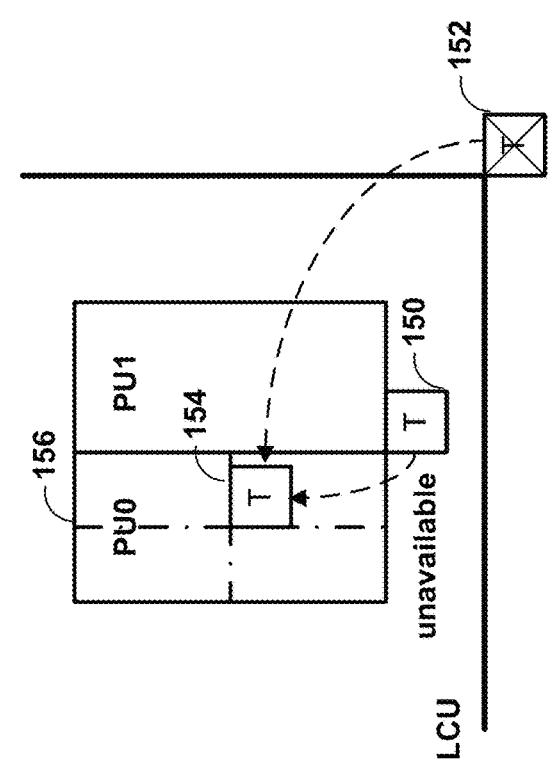

FIGS. 4A and 4B are conceptual diagrams illustrating temporal motion vector prediction (TMVP) candidates and motion vector scaling for TMVP. Video encoder 200 and video decoder 300 may be configured to add a temporal motion vector predictor (TMVP) candidate, if enabled and available, into the MV candidate list after spatial motion vector candidates. The process of motion vector derivation for TMVP candidate is the same for both merge and AMVP modes. However, in HEVC, the target reference index for the TMVP candidate in the merge mode is set to 0.

FIG. 4A shows example TMVP candidates for block PU0 156, and FIG. 4B shows a motion vector scaling process. The primary block location for TMVP candidate derivation is the bottom right block outside of the collocated PU. This candidate is shown in FIG. 4A as a block T 150. The location of block T 150 is used to compensate the bias to the above and left, blocks used to generate spatial neighboring candidates. However, if block T 150 is located outside of the current CTB row or motion information is not available, as shown with respect to block T 152, block T 152 is substituted with center block T 154 of PU 156.

A motion vector for the TMVP candidate is derived from the co-located PU of the co-located picture, indicated in the slice level. The motion vector for the co-located PU is called a collocated MV. Similar to temporal direct mode in AVC, to derive the TMVP candidate motion vector, the co-located MV may be scaled to compensate the temporal distance differences, as shown in FIG. 4B.

Video encoder 200 and video decoder 300 may be configured to perform motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Video encoder 200 and video decoder 300 may be configured to perform artificial motion vector candidate generation. If a motion vector candidate list is not complete (e.g., less than some predetermined number of candidates), artificial motion vector candidates are generated and inserted at the end of the list until the list has the designated number of candidates.

In merge mode, there are two types of artificial MV candidates: combined candidate derived only for B-slices and zero motion vector candidates used for AMVP if the first type doesn't provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Video encoder 200 and video decoder 300 may be configured to perform a pruning process for candidate insertion. Candidates from different blocks may happen to be the same, which decreases the efficiency of a merge/AMVP candidate list. A pruning process is applied to solve this problem. The pruning process compares one candidate against the others in the current candidate list to avoid inserting identical candidate in certain extent. To reduce the complexity, only limited numbers of pruning processes are applied instead of comparing each potential candidate with all the other existing candidates.

Figure 5:
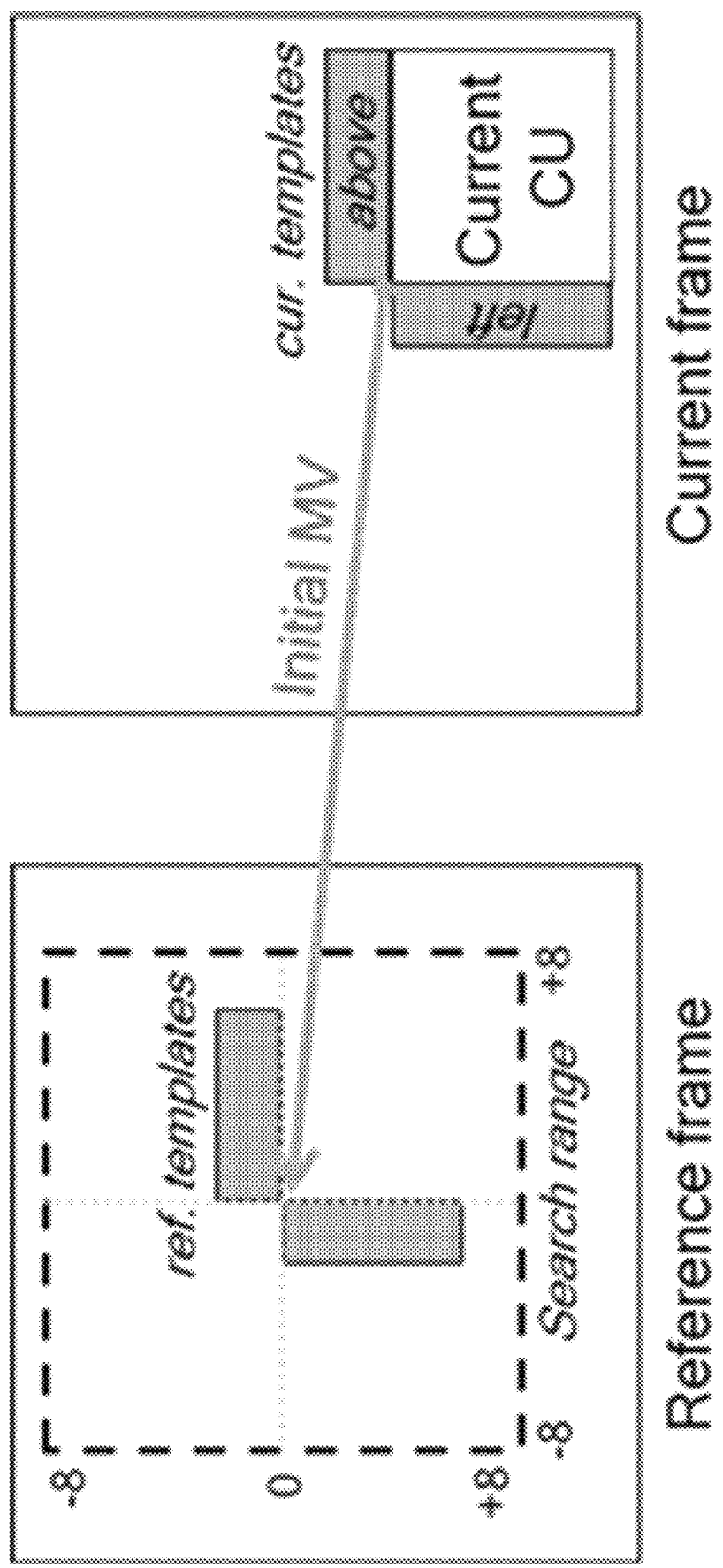
FIG. 5 is a conceptual diagram illustrating template matching performed on a search area around a block using an initial motion vector.

FIG. 5 is a conceptual diagram illustrating template matching (TM) performed on a search area around a block using an initial motion vector. Video encoder 200 and video decoder 300 may be configured to perform template matching TM prediction. TM prediction is a special merge mode based on Frame-Rate Up Conversion (FRUC) techniques. With this mode, motion information of a block is not signalled but derived at decoder side. It is applied to both AMVP mode and regular merge mode. In AMVP mode, MVP candidate selection is determined based on template matching to pick up the one which reaches the minimal difference between current block template and reference block template. In regular merge mode, a TM mode flag may be signaled to indicate the use of TM and then TM is applied to the merge candidate indicated by merge index for MV refinement.

FIG. 5 shows an example template matching being performed on a search area around initial MV. As shown in FIG. 5, video encoder 200 and video decoder 300 may be configured to use template matching to derive motion information of the current CU by finding the closest match between a template (top and/or left neighboring blocks of the current CU) in the current picture and a block (same size to the template) in a reference picture. With an AMVP candidate selected based on initial matching error, its MVP is refined by template matching. With a merge candidate indicated by signaled merge index, its merged MVs corresponding to L0 and L1 are refined independently by template matching and then the less accurate one is further refined again with the better one as a prior.

Video encoder 200 and video decoder 300 may be configured to implement a cost function. When a motion vector points to a fractional sample position, motion compensated interpolation is needed. To reduce complexity, bi-linear interpolation instead of regular 8-tap DCT-IF interpolation may be used for both template matching to generate templates on reference pictures. The matching cost C of template matching is calculated as follows:

$$C = SAD + w \cdot (|MV_x - MV_x^s| + |MV_y - MV_y^s|)$$

where w is a weighting factor which is empirically set to 4, MV and $MV^s$ indicate the currently testing MV and the initial MV (e.g., a MVP candidate in AMVP mode or merged motion in merge mode), respectively. SAD is used as the matching cost of template matching.

When TM is used, motion is refined by using luma samples only. The derived motion may be used for both luma and chroma for MC inter prediction. After MV is decided, final MC is performed using 8-taps interpolation filter for luma and 4-taps interpolation filter for chroma.

Figure 6:
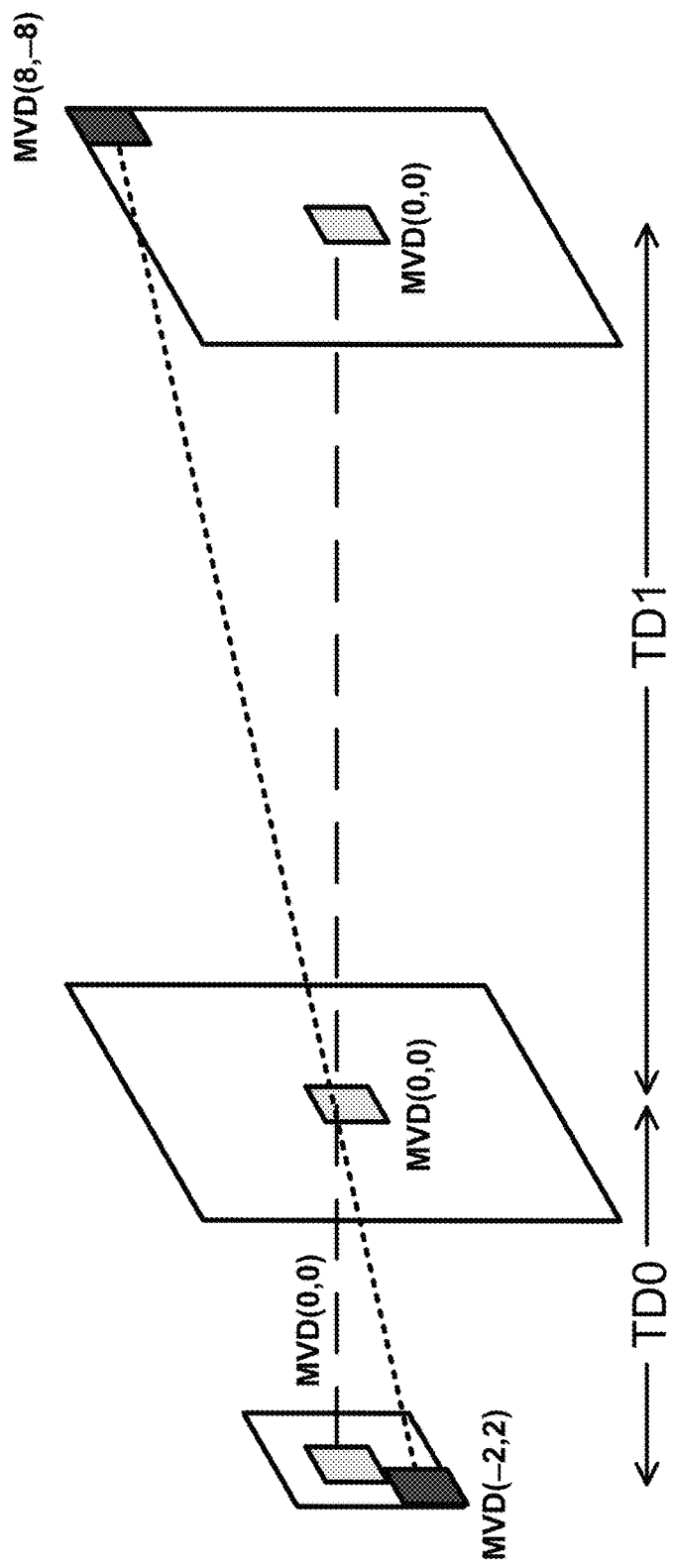
FIG. 6 is a conceptual diagram illustrating an example of bilateral matching prediction in which two motion vector difference (MVD) values are proportional based on temporal distances.

Video encoder 200 and video decoder 300 may be configured to implement a search process for motion vector (MV) refinement using template matching as discussed above. MV refinement is a pattern-based MV search with the criterion of template matching cost and a hierarchical structure. Two search patterns are supported a diamond search and a cross search for MV refinement. The hierarchical structure specifies an iterative process to refine MV, starting at a coarse motion vector difference (MVD) precision (e.g., quarter-pixel (pel)) and ending at a fine one (e.g., ⅛-pel). The MV is directly searched at quarter luma sample MVD precision with diamond pattern, followed by quarter luma sample MVD precision with cross pattern, and then this is followed by one-eighth luma sample MVD refinement with cross pattern. The search range of MV refinement is set equal to (−8, +8) luma samples around the initial MV. When the current block is of bi-prediction, both MVs are refined independently, and then the best of which (in terms of matching cost is set as a prior to further refine the other MV with bi-prediction with CU-level weight (BCW) weight values, FIG. 6 is a conceptual diagram illustrating an example of bilateral matching prediction in which two motion vector difference (MVD) values are proportional based on temporal distances. Video encoder 200 and video decoder 300 may be configured to perform bilateral matching prediction. Bilateral Matching (a.k.a., Bilateral Merge) (BM) prediction is another merge mode based on FRUC techniques. When a block is determined to apply the BM mode, two initial motion vectors MV0 and MV1 are derived by using a signaled merge candidate index to select the merge candidate in a constructed merge list. When implementing bilateral matching, video encoder 200 and video decoder 300 search around the MV0 and The final MV0' and MV1' are derived based on the minimum Bilateral Matching cost.

The motion vector difference MVD0 (denoted by MV0'-MV0) and MVD1 (denoted by MV1'-MV1) pointing to the two reference blocks may be proportional to the temporal distances (TD), e.g. TD0 and TD1, between the current picture and the two reference pictures. FIG. 6 shows an example of MVD0 and MVD1 where the TD1 is 4-times TD0. FIG. 6 shows an example of MVD0 and MVD1 being proportional based on the temporal distances.

Figure 7:
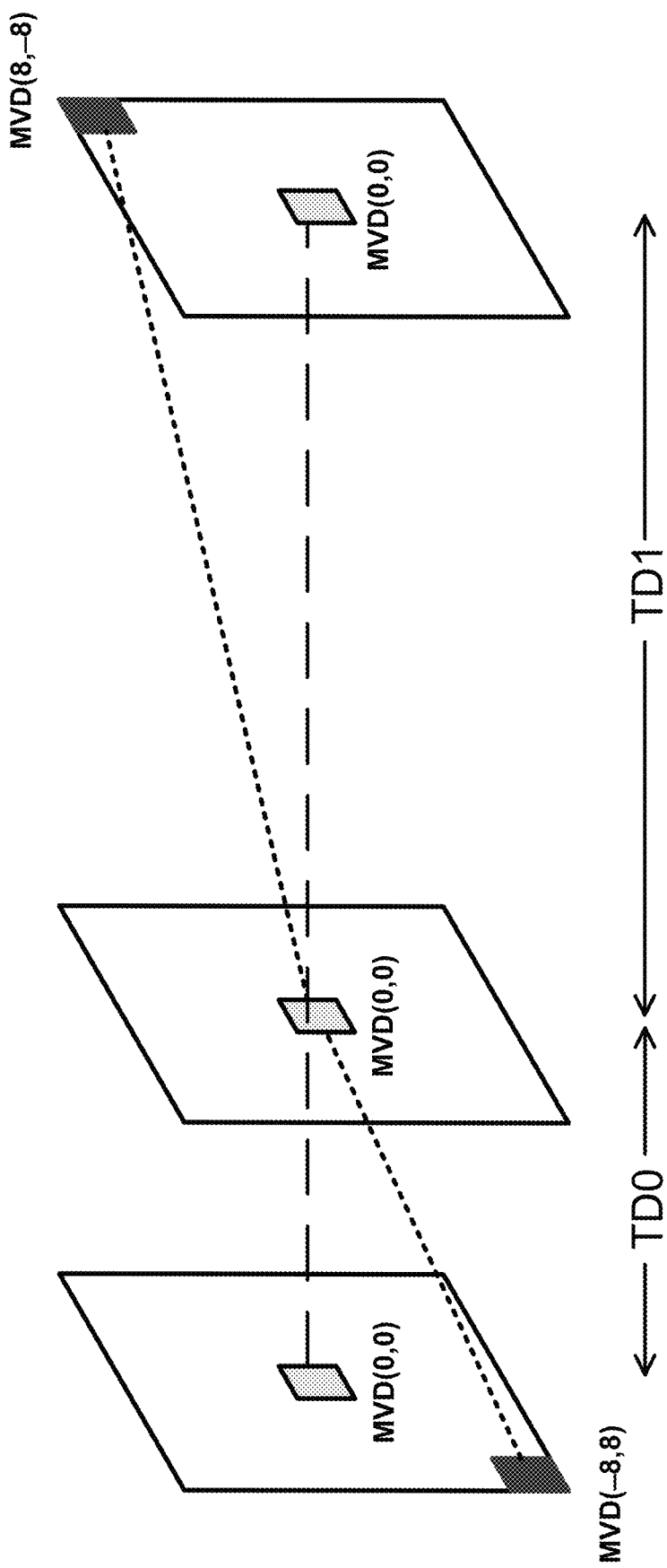
FIG. 7 is a conceptual diagram illustrating an example of bilateral matching prediction in which two MVD values are mirrored regardless of temporal distances.

FIG. 7 is a conceptual diagram illustrating an example of bilateral matching prediction in which two MVD values are mirrored regardless of temporal distances, there is an optional design that MVD0 and MVD1 are mirrored regardless of the temporal distances TD0 and TD1. FIG. 7 shows an example of MVD0 and MVD1 being mirrored regardless of the temporal distances FIG. 7 shows an example of mirrored MVD0 and MVD1 wherein, the TD1 is 4-times of TD0.

Figure 8:
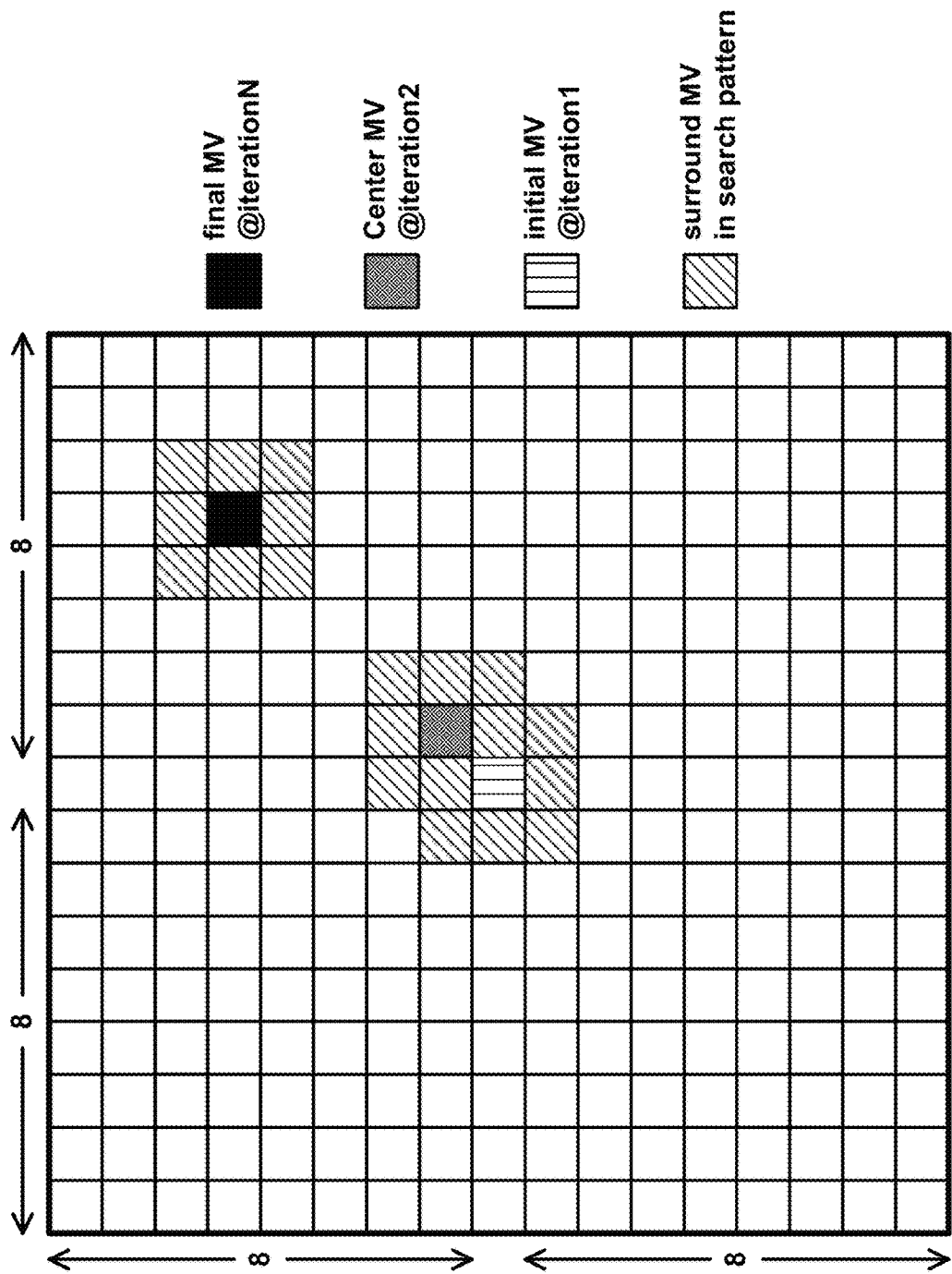
FIG. 8 is a conceptual diagram illustrating a 3×3 square search pattern in a search range.

FIG. 8 is a conceptual diagram illustrating a 3×3 square search pattern in a search range. When performing bilateral matching, video encoder 200 and video decoder 300 may be configured to perform a local search around the initial MV0 and MV1 to derive the final MV0' and MV1'. The local search applies a 3×3 square search pattern to loop through the search range [−8, 8]. In each search iteration, the bilateral matching cost of the eight surrounding MVs in the search pattern are calculated and compared to the bilateral matching cost of center MV. The MV which has minimum bilateral matching cost becomes the new center MV in the next search iteration. The local search is terminated when the current center MV has a minimum cost within the 3×3 square search pattern or the local search reaches the predefined maximum search iteration. FIG. 8 shows an example of the 3×3 square search pattern in the search range [−8, 8].

Figure 9:
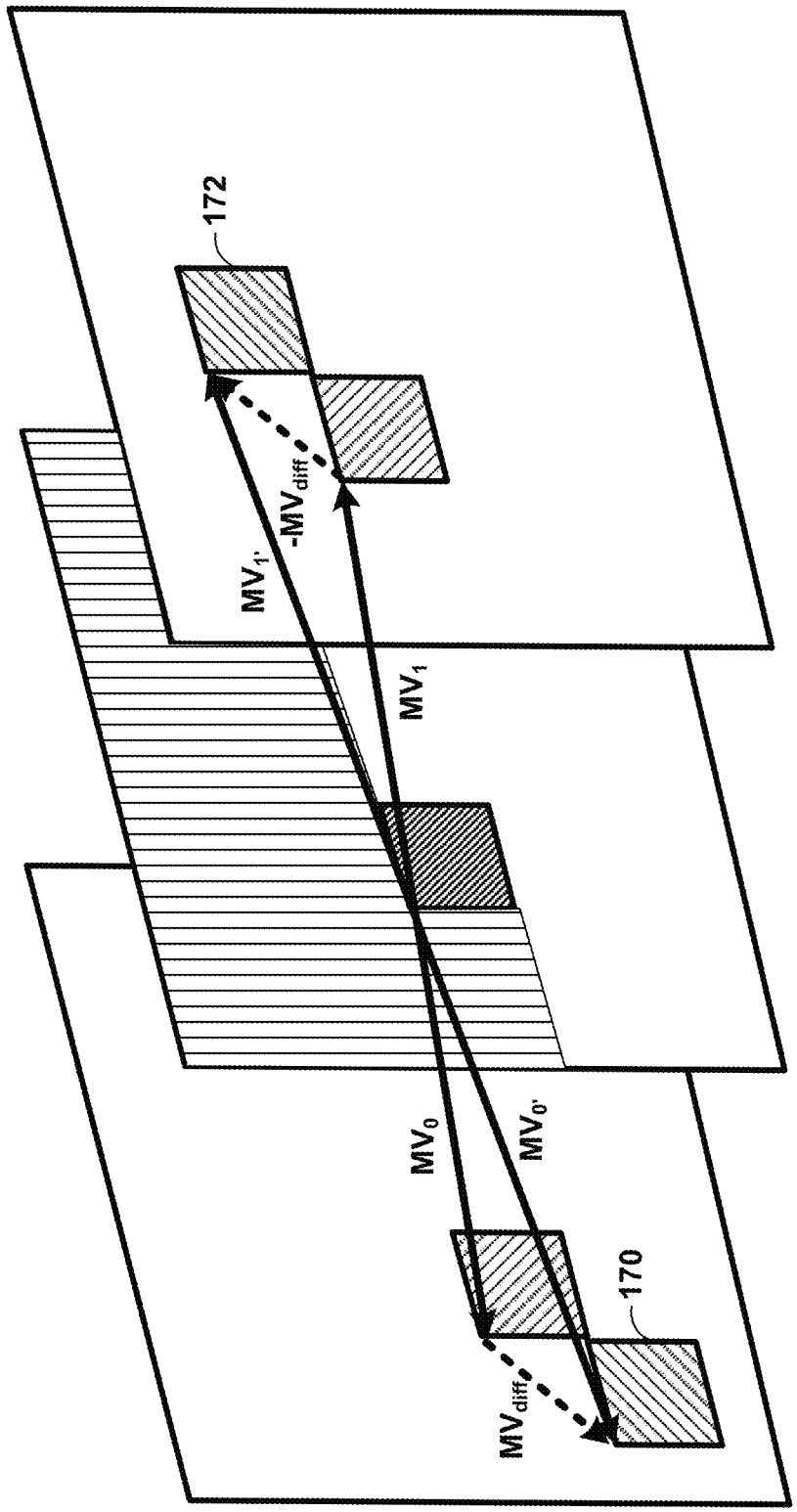
FIG. 9 is a conceptual diagram illustrating decoder-side motion vector refinement (DMVR).

FIG. 9 is a conceptual diagram illustrating decoder-side motion vector refinement (DMVR). Video encoder 200 and video decoder 300 may be configured to perform decoder-side motion vector refinement. To increase the accuracy of the MVs of the merge mode, a decoder side motion vector refinement (DMVR) is applied in VVC. In bi-prediction operation, a refined MV is searched around the initial MVs in the reference picture list L0 and reference picture list L1. The DMVR process calculates the distortion between the two candidate blocks in the reference picture list L0 and list L1. As illustrated in FIG. 9, the SAD between the blocks based on each MV candidate around the initial MV is calculated. The MV candidate with the lowest SAD becomes the refined MV and used to generate the bi-predicted signal, e.g., blocks 170 and 172 in FIG. 9.

FIG. 9 shows an example of decoding side motion vector refinement. The refined MV derived by DMVR process is used to generate the inter prediction samples and also used in temporal motion vector prediction for future pictures coding. While the original MV is used in deblocking process and also used in spatial motion vector prediction for future CU coding. DMVR is a subblock-based merge mode with a pre-defined maximum processing unit of 16×16 luma samples. When the width and/or height of a CU are larger than 16 luma samples, it may be further split into subblocks with width and/or height equal to 16 luma samples.

Video encoder 200 and video decoder 300 may be configured to implement a searching scheme. In DVMR, the search points are surrounding the initial MV and the MV offset obey the MV difference mirroring rule. In other words, any points that are checked by DMVR, denoted by candidate MV pair (MV0, MV1) obey the following two equations:

MV0'=MV0+MV_offset

MV1'=MV1+MV_offset

Where MV_offset represents the refinement offset between the initial MV and the refined MV in one of the reference pictures. The refinement search range is two integer lima samples from the initial MV. The searching includes the integer sample offset search stage and fractional sample refinement stage.

Video encoder 200 and video decoder 300 may be configured to apply a 25-point full search for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

Following the integer sample search, video encoder 200 and video decoder 300 may be configured to perform fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

Sethuraman et al., "Decoder Side MV Refinement/Derivation with CTB-level concurrency and other normative complexity reduction techniques," Joint Video Experts Team (JVET) of ITU-T SG 16 WP 3 and ISO/IEC JTC 1/SC 29/WG 11, Document JVET-K0041-v2, 11th Meeting: Ljubljana, SI, 10-18 Jul. 2018, available at phenix,it-sudparis.eu/jvet/doc_end_user/current_document.php?id=3542 (hereinafter, "JVET-K0041") describes a model-based fractional-pixel (fractional-pel) motion vector refinement process. JVET-K0041 describes using a quadratic parametric function to form a prediction error surface for each possible fractional-pel MV.

Basically, the quadratic parametric function is an interpolation function that interpolates the value of prediction errors as estimators. Based on the exact prediction errors values from integer-interval MV refinement, parameters of the quadratic parametric function can be derived, and thus the best motion sampling location on this error search can be found. Then, the original MVs are adjusted to this exact motion sampling location, instead of actually performing fractional-pel motion vector search by the codec. This parametric function takes the cost values from 5 points as reference to interpolate an error surface of all possible sampling locations of MVs and find the best location with the lowest cost value on this surface. These 5 points form a cross shape and the interval between each two adjacent points is 1-pixel-wide, where center/left/right/top/bottom point is coordinated at (0,0), (−1,0), (1,0), (0,−1) and (0,1) relative to where the MVs (that integer sample search finds) point to. Specifically, this parametric error surface function is a 2-D parabolic error surface equation:

$$E_{x,y}=A(x-\Delta x)^2+B(y-\Delta y)^2+C,$$

where $E_{x,y}$ denotes the SAD associated with a MV pointing to (MV0'+x, MV1'+y), ($\Delta x$, $\Delta y$) is an unknown term which corresponds to the position with the least cost and C corresponds to the minimum cost value.

By solving the 5 equations in 5 unknowns ($\Delta x$, $\Delta y$) is computed as:

$$\Delta x=\text{floor}((\alpha(E_{-1,0}-E_{1,0}))/(2(E_{-1,0}+E_{1,0}-2E_{0,0}))),$$

$$\Delta y=\text{floor}((\alpha(E_{0,-1}-E_{0,1}))/(2(E_{0,-1}+E_{0,1}-2E_{0,0}))),$$

where $\alpha$ is an integer scaling factor introduced to represent ($\Delta x$, $\Delta y$) in a certain fractional-pel precision, e.g. 16 for $1/16^{th}$ precision and 4 for $1/4^{th}$ precision. In VVC, 16 is always used. The computed fractional ($\Delta x$, $\Delta y$) are added to the MV that integer sample search finds to get the fractional-pel precision MV.

In VVC, the ($\Delta X$, $\Delta y$) is not computed and is set equal to (0, 0) when at least one of the following conditions is satisfied:

MV_offset as discussed above hits horizontal boundaries of the search range (e.g., ±N pixels in DMVR or bilateral matching, where N can be 1, 2, 3, 4, 5, 6, 7, 8 pixels or larger);

MV_offset as discussed above hits vertical boundaries of the search range (e.g., ±N pixels in DMVR or bilateral matching, where N can be 1, 2, 3, 4, 5, 6, 7, 8 pixels or larger);

$E_{0,0}$ is equal to 0.

Video encoder 200 and video decoder 300 may be configured to bilinear-interpolation and sample padding. In VVC, the resolution of the MVs is $1/16$ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, may be padded from those available samples.

Video encoder 200 and video decoder 300 may be configured to implement one or more enabling conditions. In one example, video encoder 200 and video decoder 300 may enabled DMVR) if the following conditions are all satisfied.

CU level merge mode with bi-prediction MV

Figure 10:
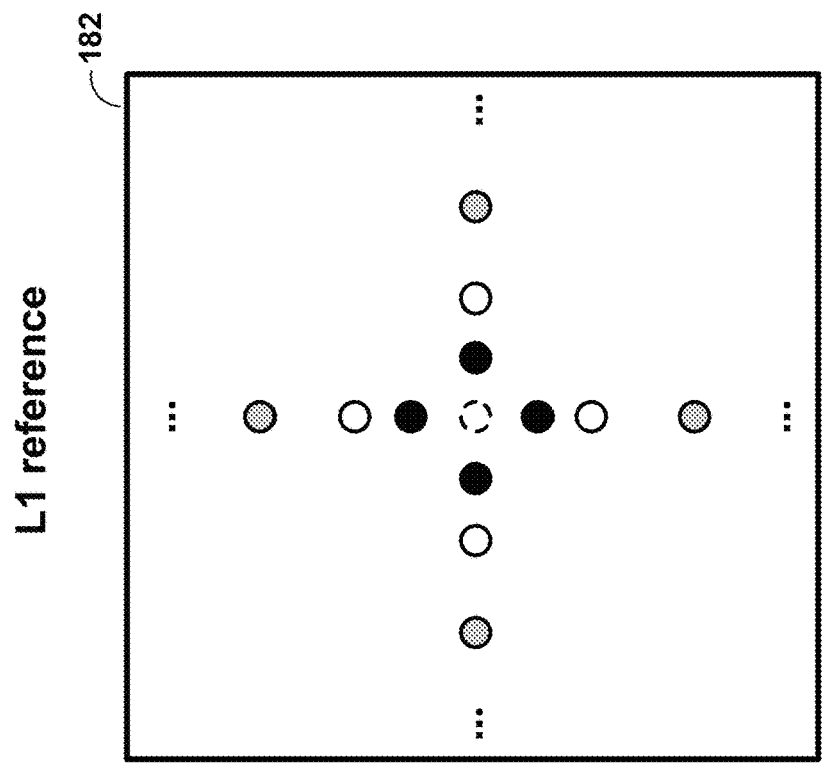
FIG. 10 is a conceptual diagram illustrating merge mode with motion vector difference (MMVD).
Figure 10:
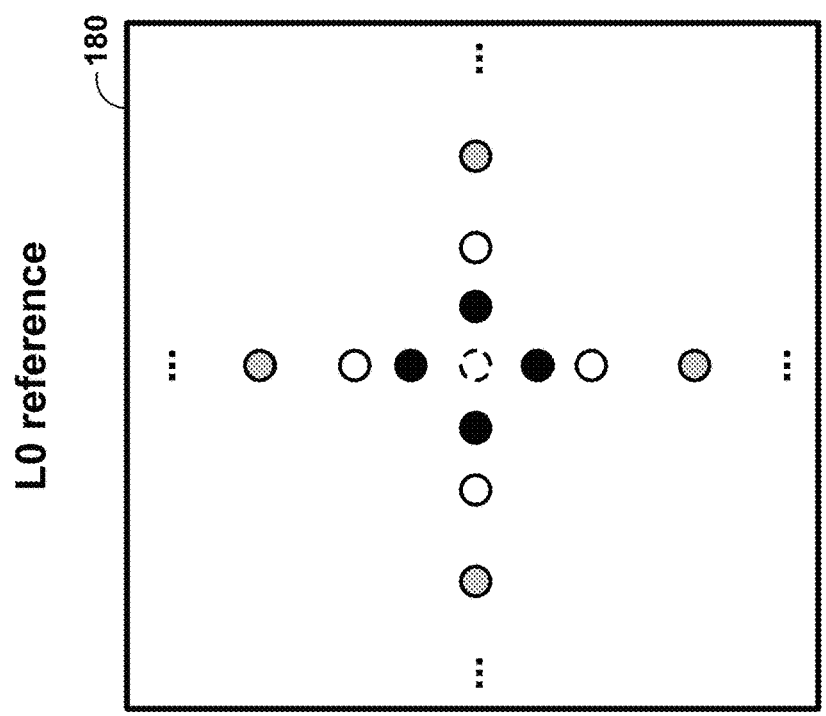

One reference picture is in the past and another reference picture is in the future with respect to the current picture The distances (e.g., POC difference) from both reference pictures to the current picture are same CU has more than 64 luma samples Both CU height and CU width are larger than or equal to 8 luma samples BCW weight index indicates equal weight Weighted prediction (WP) is not enabled for the current block Combined intra-inter prediction (CIIP) mode is not used for the current block FIG. 10 is a conceptual diagram illustrating merge mode with motion vector difference (MMVD). Video encoder 200 and video decoder 300 may be configured to implement merge bode with motion vector difference (MMVD). MMVD is a merge mode which allows signaling additional motion vector difference explicitly to refine the motion field of merge mode. An MMVD flag may be signalled right after sending a skip flag, merge flag and regular merge flag to indicate whether MMVD mode is used for a CU. In MMVD, after a merge candidate is selected, it is further refined by the signaled MVDs information. The further information includes a merge candidate flag, an index to specify motion magnitude, and an index for indication of motion direction. In MMVD mode, one for the first 2 candidates in the merge list is selected to be used as MV basis. The merge candidate flag is signaled to specify which one is used.

FIG. 10, shows an example of an MMVD search point within respective list 0 (L0) reference 180 and list 1 (L1) reference 182. A distance index specifies motion magnitude information and indicates the pre-defined offset from the starting point. As shown in FIG. 10, an offset is added to either horizontal component or vertical component of starting MV. The relation of distance index and pre-defined offset is defined as $2^{idx-2}$, where idx is an integer ranging from 0 to 7. It is noted that when a picture header syntax (e.g., pic_fpel_mmvd_enable_flag) is set to enabled, index-to-offset mapping may be changed to be $2^{idx}$.

A direction index represents the direction of the MVD relative to the starting point. The direction index can represent of the four directions, as shown in the below table, where 00, 01, 10 and 11 denote right, left, up and down, respectively. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture or are both smaller than the POC of the current picture), the sign in the below table specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in the table below specifies the sign of MV offset added to the list0 MV component of stalling MV and the sign for the list 1 MV has opposite value.

| Direction IDX | 00 | 01 | 10 | 11 |
| --- | --- | --- | --- | --- |
| x-axis | + | − | N/A | N/A |
| y-axis | N/A | N/A | + | − |

The processing procedure of conventional TM techniques may introduce an extra burden to hardware decoding designs, because the conventional techniques require performing fractional-pel search. Thus, additional interpolation is unavoidable in the conventional TM techniques to generate search-area samples with extra decoding latency in order to compute TM cost. A model-based fractional-pel MV refinement method was introduced in VVC to avoid fractional-pel interpolation. The model-based fractional-pel MV refinement method can be combined with TM to reduce the need to perform interpolation for each level of MVD precision required during the MV refinement process of TM. Thus, a lower-complexity decoder design can be expected.

This disclosure describes various techniques that may improve performance of various decoder-side motion vector derivation/refinement techniques, including template matching, bilateral matching, decoder-side motion vector refinement, model-based motion vector difference derivation, and the like. Video encoder 200 and video decoder 300 may be configured to perform the techniques of this disclosure, alone or in any combination.

In one example, video encoder 200 and video decoder 300 may be configured to perform a model-based fractional-pixel (fractional-pel) motion vector refinement to template matching (TM). At the beginning, video encoder 200 and video decoder 300 may begin the TM search process at integer-MVD precision on a pre-defined search range [±$SR_x$, ±$SR_y$] around the initial MV ($v_x$, $v_y$), where SRx and SRy are integer values. Without loss of generality, this disclosure assumes ($v_x$, $v_y$) is represented in the highest MV storage precision (e.g., 16 in VVC, 4 in HEVC) and $SR_x$ and $SR_y$ are already scaled according to the highest MV storage precision. When the search process of TM is completed, the lowest template matching error (e.g., SAD, SSE, MRSAD, MRSSE, SSIM, MS-SSIM) within the search range is denoted as $E_{0,0}$, and the template matching errors of respective adjacent points at left/right/top/bottom (i.e., all of them located 1-pixel next to the center one) are denoted as $E_{-1,0}$, $E_{1,0}$, $E_{0,-1}$ and $E_{0,1}$.

For simplicity, the motion vector associated with $E_{0,0}$ is denoted ($v_x'$, $v_y'$), where |($v_x'$, $v_y'$)−($v_x$, $v_y$)|≤($SR_x$, $SR_y$). Then, as discussed above, video encoder 200 and video decoder 300 set errors values ($E_{0,0}$, $E_{-1,0}$, $E_{1,0}$, $E_{0,-1}$ and $E_{0,1}$) as inputs to the model-based fraction-pel MV refinement method to derive (Δx, Δy), and the resulting motion vector of TM becomes ($v_x'$+Δx, $v_y'$+Δy). Similarly, (Δx, Δy) can be a zero vector, e.g., if at least one of the conditions discussed above is satisfied (and reproduced below):

|$v_x'$−$v_x$| is equal to $SR_x$;

|$v_y'$−$v_y$| is equal to $SR_y$;

$E_{0,0}$ is equal to 0.

To simplify the description, this disclosure assumes a necessary scaling factor specified by adaptive motion vector resolution (AMVR) mode is already applied to $(v_x', v_y')$ before it is added with $(\Delta x, \Delta y)$.

In one example, the aforementioned conditions can be changed, so the model-based fraction-pel MV refinement method can be applied to refine only one direction of the MV $(v_x', v_y')$, as follows.

If $E_{0,0} \neq 0$ and $|v_x' - v_x| < SR_x$, $\Delta x$ can be derived based on $E_{0,0}$, $E_{-1,0}$ and $E_{1,0}$; otherwise, if $E_{0,0} = 0$ or $|v_x' - v_x| \geq SR_x$, $\Delta x$ is set equal to 0.

If $E_{0,0} \neq 0$ and $|v_y' - v_y| < SR_y$, $\Delta y$ can be derived based on $E_{0,0}$, $E_{0,-0}$ and $E_{0,1}$; otherwise, if $E_{0,0} = 0$ or $|v_y' - v_y| \geq SR_y$, $\Delta y$ is set equal to 0.

In some examples, video encoder 200 and video decoder 300 may be configured with additional enabling conditions for the model-based fractional-pel MV refinement. For example, video encoder 200 and video decoder 300 may be configured to enable or disable the model-based fraction-pel MV refinement with additional conditions on top of those discussed above. The enabling/disabling conditions can be any of the following:
- the initial MVs of TM have been refined by bilateral matching or DMVR;
- the resulting MVs of TM will be further refined by bilateral matching or DMVR,
- the enabling conditions of bilateral matching or DMVR are satisfied, i.e., each of the following is true:
  - CU level merge mode with bi-prediction MV
  - One reference picture is in the past and another reference picture is in the future with respect to the current picture
  - The distances (i.e. POC difference) from both reference pictures to the current picture are same
  - CU has more than 64 luma samples
  - Both CU height and CU width are larger than or equal to 8 luma samples
  - BCW weight index indicates equal weight
  - Weighted prediction (WP) is not enabled for the current block
  - Combined intra-inter prediction (CIIP) mode is not used for the current block Alternatively, the enabling/disabling conditions may be:
- the initial MVs of TM are not refined by bilateral matching or DMVR;
- the resulting MVs of TM will not be further refined by bilateral matching or DMVR;
- the enabling conditions of bilateral matching or DMVR are not satisfied, i.e., at least one of the following is not true:
  - CU level merge mode with bi-prediction MV
  - One reference picture is in the past and another reference picture is in the future with respect to the current picture
  - The distances (i.e. POC difference) from both reference pictures to the current picture are same
  - CU has more than 64 luma samples
  - Both CU height and CU width are larger than or equal to 8 luma samples
  - BCW weight index indicates equal weight
  - Weighted prediction (WP) is not enabled for the current block
  - Combined intra-inter prediction (CIIP) mode is not used for the current block In some examples, video encoder 200 and video decoder 300 may adjust the $\alpha$ term defined adaptively according to AMVR mode or the use of half-pel interpolation filter (which is the same filter that is used when AMVR mode is of half-pel precision). For example:
- When AMVR mode is of full-pel, 2-pel, 4-pel or lower (i.e., more than 4-pel), the model-based fraction-pel MV refinement method is not applied or the $\alpha$ term is set equal to 0 or 1.
- When AMVR mode is of half-pel or half-pel interpolation filter is used, the $\alpha$ term is set equal to 2.
- When AMVR mode is of quarter-pel, the $\alpha$ term is set equal to 4.
- When AMVR, mode is of ⅛-pel, the $\alpha$ term is set equal to 8.
- When AMVR mode is of 1/16-pel, $\alpha$ term is set equal to 16.
- When AMVR mode is of 1/N-pel (where N is 32, 64, 128, or higher), the $\alpha$ term is set equal to N.

Since this disclosure assumes $(v_x, v_y)$ is represented in the highest MV storage precision (e.g., 16 in VVC, 4 in HEVC), the model output $(\Delta x, \Delta y)$ need to be adjusted according to the value of the $\alpha$ term. In the cases when $\alpha \leq 16$, the model output becomes:

$$\Delta x = s * \text{floor}((\alpha(E_{-1,0} - E_{1,0}))/(2(E_{-1,0} + E_{1,0} - 2E_{0,0}))),$$

$$\Delta y = s * \text{floor}((\alpha(E_{0,-1} - E_{0,1}))/(2(E_{0,-1} + E_{0,1} - 2E_{0,0}))),$$

where $s = 16/\alpha$. In the other cases when $\alpha > 16$, the MV storage precision must be higher than 16, and then the scaling factors of the model output becomes $M/\alpha$, where M is the MV storage precision of $(v_x, v_y)$ and $M \geq N$.

In another example, the $\alpha$ term is set equal to 16 (or the highest one according to MV storage precision, e.g., 16 in VVC, 4 in HEVC), regardless of the use of half-pel interpolation filler. Then, the resulting MV, that is $(v_x' + \Delta x, v_y' + \Delta y)$ of TM is rounded to the MV precision indicated by AMVR mode.

In another example, the $\alpha$ term is set equal to 16 (or the highest one according to MV storage precision, e.g., 16 in VVC, 4 in HEVC), regardless of the use of AMVR mode. Then, the resulting MV, that is $(v_x' + \Delta x, v_y' + \Delta y)$ of TM is rounded to the MV precision indicated by AMVR mode.

Certain techniques of U.S. Provisional Application No. 63/131,676, tiled Dec. 29, 2020, may be combined with the model-based fractional-pel MV refinement techniques of this disclosure as discussed below. As disclosed therein, TM search precision may vary according to AMVR mode. For example, when AMVR mode is of quarter-pel, video encoder 200 and video decoder 300 may start the TM searching process at full-pel, followed by half-pel and stopping at quarter-pel MVD precision. In this example, TM does not search toward the highest MVD precision indicated by AMVR mode in simplification point of view. In some examples, video encoder 200 and video decoder 300 may be configured to perform the following:
- When AMVR mode is half-pel, TM starts at full-pel MVD precision and stops, and then the model-based method is applied with $\alpha=2$, $s=8$ and $\{E_{0,0}, E_{-1,0}, E_{1,0}, E_{0,-1}, E_{0,1}\}$.
- When AMVR mode is quarter-pel, TM can start at full-pel and stop, and then the model-based method is applied with $\alpha=4$, $s=4$ and $\{E_{0,0}, E_{-1,0}, E_{1,0}, E_{0,-1}, E_{0,1}\}$ is replaced by using $\{E_{0,0}, E_{-0.5,0}, E_{0.5,0}, E_{0,-0.5}, E_{0,0.5}\}$.
- When AMVR mode is 1/16-pel. TM can start at full-pel and stop, and then the model-based method is applied with $\alpha=16$, $s=1$ and $\{E_{0,0}, E_{-1,0}, E_{1,0}, E_{0,-1}, E_{0,1}\}$.
- When AMVR mode is 1/16-pel, TM can begin with full-pel and stop at half-pet, and then the model-based method is applied with α=8, s=1 and {$E_{0,0}$, $E_{-1,0}$, $E_{1,0}$, $E_{0,-1}$, $E_{0,1}$} replaced by using {$E_{0,0}$, $E_{-0.5,0}$, $E_{0.5,0}$, $E_{0,-0.5}$, $E_{0,0.5}$}.

When AMVR mode is 1/16-pel, TM can begin with full-pel, followed by half-pel and stop at quarter-pel, and then the model-based method is applied with α=4, s=1 and {$E_{0,0}$, $E_{-1,0}$, $E_{1,0}$, $E_{0,-1}$, $E_{0,1}$} is replaced by using {$E_{0,0}$, $E_{-0.25,0}$, $E_{0.25,0}$, $E_{0,-0.25}$, $E_{0,0.25}$}.

When AMVR mode is 1/16-pel, TM can begin with full-pel and followed sequentially by half-pel and quarter-pel and stop at 1/8-pel, and then the model-based method is applied with α=2, s=1 and {$E_{0,0}$, $E_{-1,0}$, $E_{1,0}$, $E_{0,-1}$, $E_{0,1}$} is replaced by using {$E_{0,0}$, $E_{-0.125,0}$, $E_{0.125,0}$, $E_{0,-0.125}$, $E_{0,0.125}$}.

In various examples, the four adjacent points would not be always located around the center one with 1-pixel distance, because video encoder 200 and video decoder 300 may be configured to perform TM search at higher MVD precision beyond full-pel one. The distance could be less than 1 pixel according to AMVR mode. For example, {$E_{0,0}$, $E_{-1,0}$, $E_{1,0}$, $E_{0,-1}$, $E_{0,1}$} is replaced by using {$E_{0,0}$, $E_{-0.5,0}$, $E_{0.5,0}$, $E_{0,-0.5}$, $E_{0,0.5}$} when AMVR mode is of half-pel.

In some examples, video encoder 200 and video decoder 300 perform the TM search at only full-pel precision regardless of AMVR mode and applies the model-based method with α=16, s=1 and {$E_{0,0}$, $E_{-1,0}$, $E_{1,0}$, $E_{0,-1}$, $E_{0,1}$}. Then, the resulting MVs are rounded to the MV precision indicated by AMVR mode.

In some examples, video encoder 200 and video decoder 300 perform the TM search at full-pel and half-pel precisions regardless of AMVR mode and applies the model-based method α=8, s=1 and {$E_{0,0}$, $E_{-0.5,0}$, $E_{0.5,0}$, $E_{0,-0.5}$, $E_{0,0.5}$}. Then, the resulting MVs are rounded to the MV precision indicated by AMVR mode.

In some examples, video encoder 200 and video decoder 300 perform the TM search at full-pel, half pet and quarter-pel precisions regardless of AMVR mode and applies the model-based α=4, s=1 and {$E_{0,0}$, $E_{-0.25,0}$, $E_{0.25,0}$, $E_{0,-0.25}$, $E_{0,0.25}$}. Then, the resulting MVs are rounded to the MV precision indicated by AMVR mode.

In some examples, video encoder 200 and video decoder 300 perform the TM search at full-pel, half-pet, quarter-pet and 1/8-pel precisions regardless of AMVR mode and applies the model-based method with α=2, s=1 and {$E_{0,0}$, $E_{-0.125,0}$, $E_{0.125,0}$, $E_{0,-0.125}$, $E_{0,0.125}$}. Then, the resulting MVs are rounded to the MV precision indicated by AMVR mode.

In some examples, video encoder 200 and video decoder 300 perform the TM search at full-pel and half-pel precisions and applies the model-based method with α=8, s=2 and {$E_{0,0}$, $E_{-0.5,0}$, $E_{0.5,0}$, $E_{0,-0.5}$, $E_{0,0.5}$}. Then, the resulting MVs are rounded to the MV precision indicated by AMVR mode.

Video encoder 200 and video decoder 300 may be configured to perform a simplified search process for bi-predicted TM merge mode. In some examples, the TM merge mode for a bi-prediction block becomes a twofold process: (1) selecting one of the MVs for MV refinement performed by TM and (2) then the refined MV is set as a prior to further refine the other MV with BCW weight values. There are several rules, as follows, that may be defined for step 1 to pickup one MV from a bi-prediction block:

MV associated with reference picture list Lx, where x can be either 0 or 1.

MV associated with reference picture list Lx, where x is set equal 1 when ph_mvd_l1_zero_flag=true, (It is noted ph_mvd_l1_zero_flag may be named differently in various video standards, but its functionality remains the same, that is, forcing $MVD_{L1}$ to be zero and skipping syntax signaling for $MVD_{L1}$).

MV associated with reference picture list Lx, where x is set equal 1 when ph_mvd_l1_zero_flag=false.

MV associated with reference picture list Lx, where x can be either 0 or 1 depending on the respective TM costs of $MV_{L0}$ and $MV_{L1}$. If the TM cost of $MV_{L0}$ is lower, x is set equal to 0; otherwise, it is set equal to 1.

MV associated with reference picture list Lx, where x can be either 0 or 1 depending on the respective TM costs of $MV_{L0}$ and $MV_{L1}$. If the TM cost of $MV_{L0}$ is lower, x is set equal to 1; otherwise, it is set equal to 0.

In some examples, when the current block is bi-predicted, one of the MVs is selected (following one of the above defined methods) as a prior to further refine the other MV with BCW weight values.

In some examples, video encoder 200 and video decoder 300 may be configured to use a constrained search range for TM merge mode. For example, when performing bilateral matching (BM) mode prior to TM merge mode, video encoder 200 and video decoder 300 may be configured to use TM to further refine the BM-refined MVs within the same search range around the initial MVs of BM. Thus, both TM and BM can share the same reference samples fetched from reference pictures. Similarly, when TM is performed prior to BM, BM may be used to further refine the TM-refined MVs within the same search range around the initial MVs of TM. Thus, both TM and BM can share the same reference samples fetched from reference pictures.

In some examples, TM and BM may form a cascading process in which TM would perform prior to BM or BM would perform prior to TM. No matter which one comes at first, their search process may not only be restricted within the same search range but also limited to integer MVD precision only. Fraction-pet MV refinement may be performed only at the stage of TM or BM, whichever is performed at the last of the cascading process. For example, video encoder 200 and video decoder 300 may be configured with a cascading process of {→TM→subblock BM} and the fraction-pel MV refinement performs only at the stage of subblock BM while the others perform only at integer MVD precision. In another example that subblock BM may be disabled, the fraction-pel MV refinement performs only at the stage of TM while the other performs only at integer MVD precision.

In some examples, when the AMVR mode is of 4-pel, video encoder 200 and video decoder 300 may disable TM AMVP mode. "Disabled" may mean that template matching is neither applied to refine AMVP candidates nor used to select AMVP candidate, so the AMVP mode performs identically to VVC or HEVC without changes. In some examples, when AMVR mode is of 2-pel or lower (e.g., 4-pel or more pels), video encoder 200 and video decoder 300 may disable TM AMVP mode.

Figure 11:
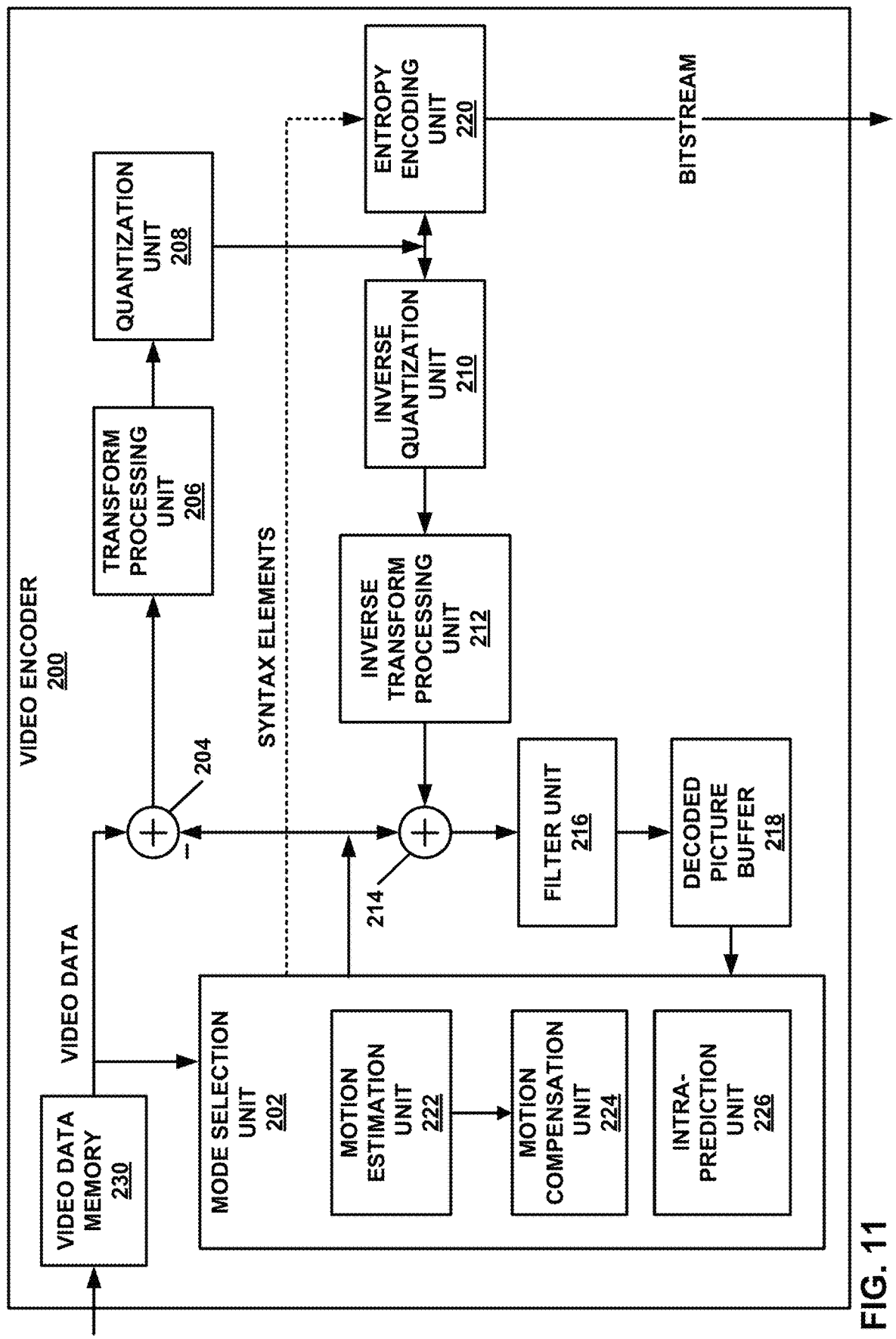
FIG. 11 is a block diagram illustrating an example video encoder that may perform the techniques of this disclosure.

FIG. 11 is a block diagram illustrating an example video encoder 200 that may perform the techniques of this disclosure. FIG. 11 is provided for purposes of explanation and should not be considered limiting of the techniques as broadly exemplified and described in this disclosure. For purposes of explanation, this disclosure describes video encoder 200 in the context of video coding standards such as the ITU-T H.265/HEVC video coding standard and the VVC video coding standard in development. However, the techniques of this disclosure are not limited to these video coding standards and are applicable generally to other video encoding and decoding standards.

In the example of FIG. 11, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220, Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 11 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware, Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes motion estimation unit 222, motion compensation unit 224, and intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure, Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Moreover, motion compensation unit 224 may be configured to perform decoder-side motion vector refinement/ derivation techniques according to any or all of the techniques of this disclosure, in any combination. For example, motion compensation unit 224 may perform template matching and model-based fractional-pixel motion vector refinement to refine a full-pixel resolution motion vector initially received from motion estimation unit 222 and using these techniques.

For example, motion compensation unit 224 may receive an initial motion vector from motion estimation unit 222. The initial motion vector may have full-integer pixel resolution. Motion compensation unit 224 and entropy encoding unit 220 may encode the initial motion vector using advanced motion vector prediction (AMVP) using a motion vector difference (MVD) value having full-integer pixel precision, Motion compensation unit 224 may further refine the initial motion vector, e.g., including determination of a search range around a reference area identified by the initial motion vector in a reference picture. Motion compensation unit 224 may then perform a template matching search process in the search range to identify a best matching region. The best matching region may be a region yielding a lowest rate-distortion optimization (RDO) value. The RDO value may be calculated using, for example, sum of absolute difference values, sum of squared difference values, mean absolute difference values, mean squared difference values, or the like.

Through determining the best matching region, motion compensation unit 224 may obtain an integer-precision refined motion vector, Motion compensation unit 224 may then further determine error values for neighboring pixels in the best matching region to perform a model-based fractional-pixel motion vector refinement to derive motion vector difference values (e.g., x- (horizontal) and/or y- (vertical) component motion vector difference values). Motion compensation unit 224 may further apply at least one of the motion vector difference values to the initial motion vector to determine a refined motion vector for the current block. The refined motion vector may have fractional pixel precision. Motion compensation unit 224 may then use the refined motion vector to generate a prediction block and provide the prediction block to residual generation unit 204 and reconstruction unit 214.

In particular, for each of the motion vector difference components, motion compensation unit 224 may determine whether an error value for the best matching region is equal to zero. Motion compensation unit 224 may then, after further determining that an absolute value of a difference between a component of the initial motion vector and a corresponding motion vector difference value for the component is less than a corresponding search region value for the component, apply the motion vector difference value for the component to the component of the initial motion vector.

As noted above, motion compensation unit 224 (or mode selection unit 202) may also determine whether to perform the motion vector refinement techniques of this disclosure. For example, mode selection unit 202 or motion compensation unit 224 may determine each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block, and in response, to determine the motion vector refinement techniques.

In some examples, if the current block is bi-predicted, motion compensation unit 224 may perform these motion vector refinement techniques for both motion vectors for the current block.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block, in some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units, Video encoder 200 and video decoder 300 may support PUs having, various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N. N×N, or similar for inter prediction. Video encoder 200 and video decoder 300 may also support asymmetric partitioning for PU sizes of 2×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU, The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead may generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the lama coding block and the chroma coding blocks.

In this manner, video encoder 200 of FIG. 11 represents an example of a device for encoding and decoding video data including a memory configured to store video data; and one or more processors implemented in circuitry and configured to: determine an initial motion vector for a current block of the video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

Figure 12:
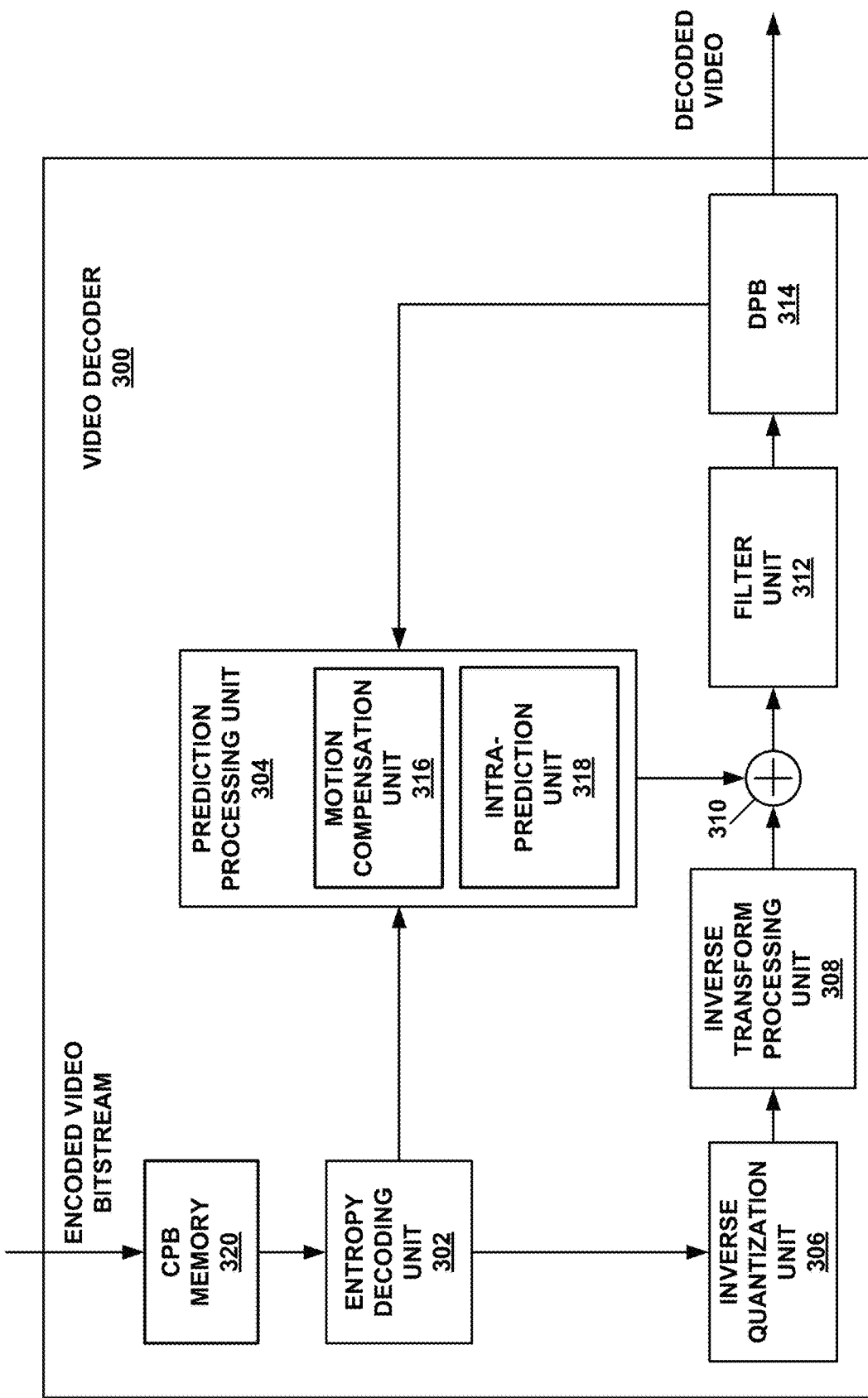
FIG. 12 is a block diagram illustrating an example video decoder that may perform the techniques of this disclosure.

FIG. 12 is a block diagram illustrating an example video decoder 300 that may perform the techniques of this disclosure. FIG. 12 is provided for purposes of explanation and is not limiting on the techniques as broadly exemplified and described in this disclosure. For purposes of explanation, this disclosure describes video decoder 300 according to the techniques of VVC and HEVC (ITU-T H.265). However, the techniques of this disclosure may be performed by video coding devices that are configured to other video coding standards.

In the example of FIG. 12, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream.

CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 12 are illustrated to assist with understanding the operations performed by video decoder 300. The units may be implemented as fixed-function circuits, programmable circuits, or a combination thereof. Similar to FIG. 11, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture, Motion compensation unit 316 may generally perform the inter-prediction process in a manner that is substantially similar to that described with respect to motion compensation unit 224 (FIG. 11).

Furthermore, according to the techniques of this disclosure, motion compensation unit 316 may refine a decoded motion vector received from entropy decoding unit 302 using, e.g., template matching and model-based fractional-pixel motion vector refinement. Motion compensation unit 316 may apply any or all of the techniques of this disclosure for decoder-side motion vector refinement/derivation, alone or in any combination.

Moreover, motion compensation unit 316 may be configured to perform decoder-side motion vector refinement/derivation techniques according to any or all of the techniques of this disclosure, in any combination. For example, motion compensation unit 316 may perform template matching and model-based fractional-pixel motion vector refinement to refine a full-pixel resolution motion vector initially received from entropy decoding unit 302 and using these techniques.

For example, motion compensation unit 316 may receive data representing an initial motion vector from entropy decoding unit 302. The initial motion vector may have full-integer pixel resolution. Motion compensation unit 316 and entropy decoding unit 302 may decode the initial motion vector using advanced motion vector prediction (AMVP) using a motion vector difference (MVD) value having full-integer pixel precision. Motion compensation unit 316 may further refine the initial motion vector, e.g., including determination of a search range around a reference area identified by the initial motion vector in a reference picture. Motion compensation unit 316 may then perform a template matching search process in the search range to identify a best matching region. The best matching region may be a region yielding a lowest rate-distortion optimization (RDO) value. The RDO value may be calculated using, for example, sum of absolute difference values, sum of squared difference values, mean absolute difference values, mean squared difference values, or the like.

Through determining the best matching region, motion compensation unit 316 may obtain an integer-precision refined motion vector. Motion compensation unit 316 may then further determine error values for neighboring pixels in the best matching region to perform a model-based fractional-pixel motion vector refinement to derive motion vector difference values x- (horizontal) and/or y- (vertical) component motion vector difference values). Motion compensation unit 316 may further apply at least one of the motion vector difference values to the initial motion vector to determine a refined motion vector for the current block. The refined motion vector may have fractional pixel precision. Motion compensation unit 316 may then use the refined motion vector to generate a prediction block and provide the prediction block to reconstruction unit 310.

In particular, for each of the motion vector difference components, motion compensation unit 316 may determine whether an error value for the best matching region is equal to zero. Motion compensation unit 316 may then, after further determining that an absolute value of a difference between a component of the initial motion vector and a corresponding motion vector difference value for the component is less than a corresponding search region value for the component, apply the motion vector difference value for the component to the component of the initial motion vector.

As noted above, motion compensation unit 316 may also determine whether to perform the motion vector refinement techniques of this disclosure. For example, motion compensation unit 316 may determine each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CRP) mode is not used for the current block, and in response, to determine the motion vector refinement techniques.

In some examples, if the current block is bi-predicted, motion compensation unit 316 may perform these motion vector refinement techniques for both motion vectors for the current block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 11). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 of FIG. 12 represents an example of a device for decoding video data including a memory configured to store video data; and one or more processors implemented in circuitry and configured to: determine an initial motion vector for a current block of the video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model based fractional-pixel motion vector refinement to derive motion vector difference values; apply at least one of the motion vector difference values to the initial motion vector to determine a refined motion vector for the current block; and decode the current block using the refined motion vector.

Figure 13:
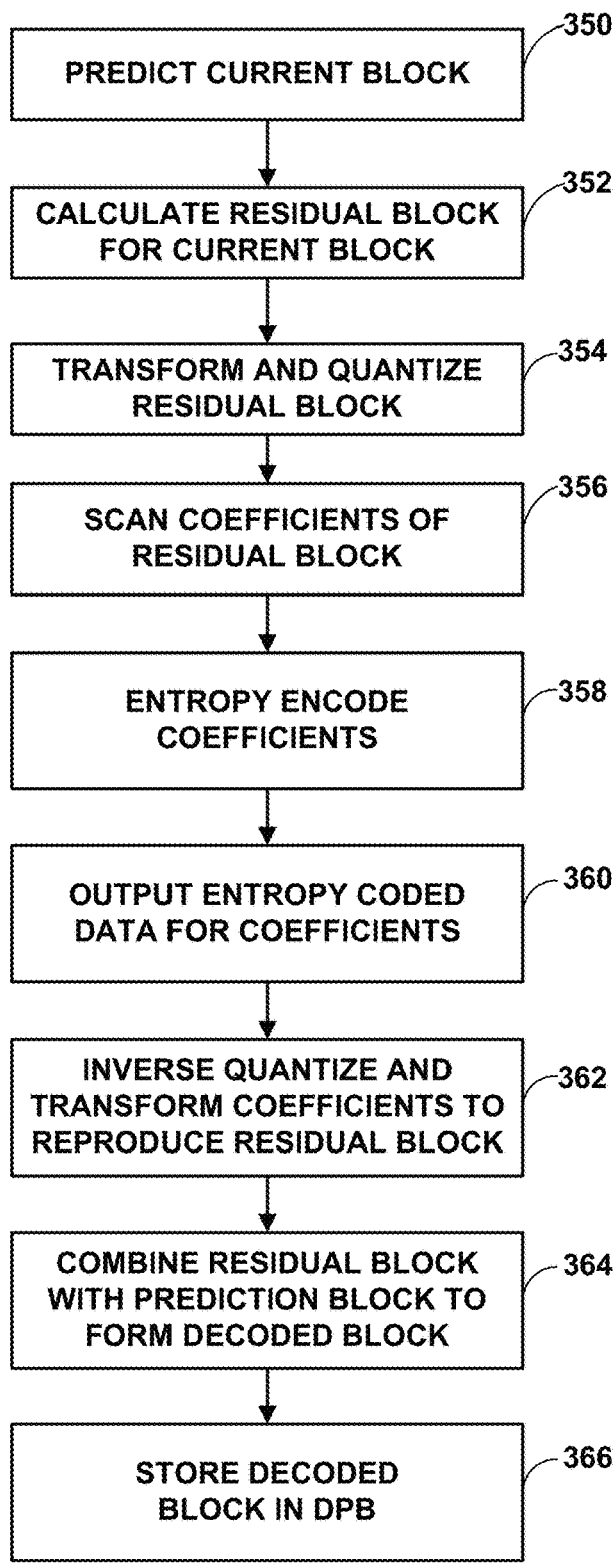
FIG. 13 is a flowchart illustrating an example method for encoding a current block in accordance with the techniques of this disclosure.

FIG. 13 is a flowchart illustrating an example method for encoding a current block in accordance with the techniques of this disclosure. The current block may comprise a current CU. Although described with respect to video encoder 200 (FIGS. 1 and 11), it should be understood that other devices may be configured to perform a method similar to that of FIG. 13.

In this example, video encoder 200 initially predicts the current block (350). For example, video encoder 200 may form a prediction block for the current block. In particular, video encoder 200 may apply any or all of the techniques of this disclosure, alone or in any combination, to perform decoder-side motion vector derivation/refinement, e.g., using model-based motion vector difference derivation and template matching prediction, to form a refined motion vector, then generate the prediction block using the refined motion vector. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

In this manner, the method of FIG. 13 represents an example of a method of decoding video data including determining an initial motion vector for a current block of video data, the initial motion vector having integer-motion vector difference (MVD) precision; determining a search range around a reference area identified by the initial motion vector in a reference picture; performing a template matching search process in the search range to identify a best matching region; determining error values for neighboring pixels to the best matching region; using the error values for the neighboring pixels to perform a model-based fractional-pixel motion vector refinement to derive motion vector difference values; applying at least one of the motion vector difference values to the initial motion vector to determine a refined motion vector for the current block; and decoding the current block using the refined motion vector. The method of FIG. 13 also represents such a method of encoding video data.

Figure 14:
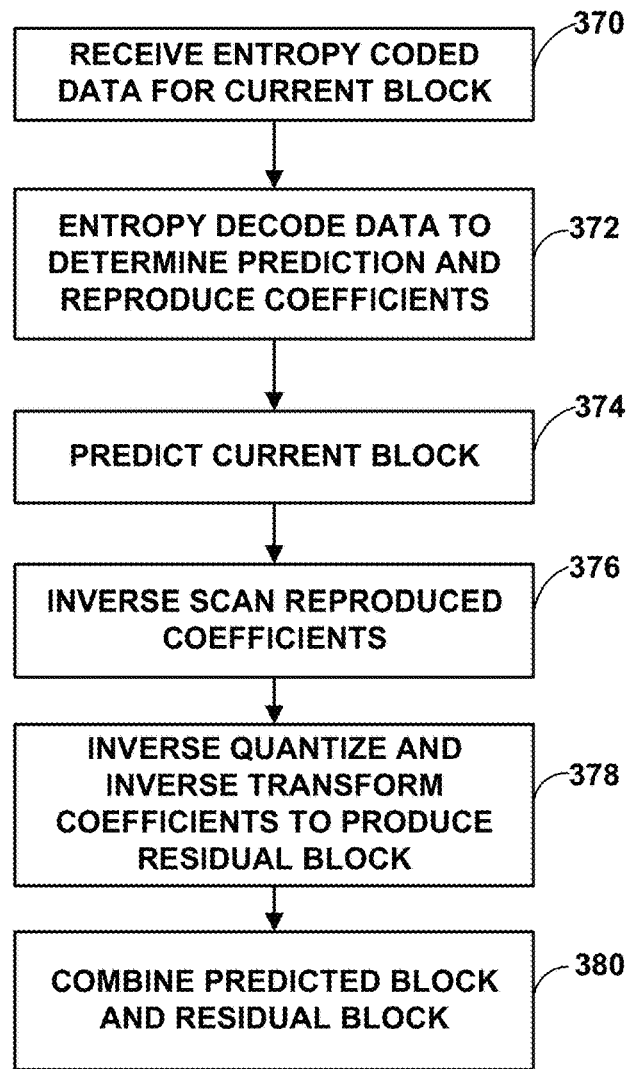
FIG. 14 is a flowchart illustrating an example method for decoding a current block in accordance with the techniques of this disclosure.

FIG. 14 is a flowchart illustrating an example method for decoding a current block in accordance with the techniques of this disclosure. The current block may comprise a current CU. Although described with respect to video decoder 300 (FIGS. 1 and 12), it should be understood that other devices may be configured to perform a method similar to that of FIG. 14.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an inter-prediction mode as indicated by the prediction information for the current block, to calculate a prediction block for the current block. In particular, video decoder 300 may apply any or all of the techniques of this disclosure, alone or in any combination, to perform decoder-side motion vector derivation/refinement, e.g., using model-based motion vector difference derivation and template matching prediction, to form a refined motion vector, then generate the prediction block using the refined motion vector. Video decoder 300 may then inverse scan the reproduced coefficients (376), to create a block of quantized transform coefficients. Video decoder 300 may then inverse quantize and inverse transform the quantized transform coefficients to produce a residual block (378). Video decoder 300 may ultimately decode the current block by combining the prediction block and the residual block (380).

In this manner, the method of FIG. 14 represents an example of a method of decoding video data including determining an initial motion vector for a current block of video data, the initial motion vector having integer-motion vector difference (MVD) precision; determining a search range around a reference area identified by the initial motion vector in a reference picture; performing a template matching search process in the search range to identify a best matching region; determining error values for neighboring pixels to the best matching region; using the error values for the neighboring pixels to perform a model-based fractional-pixel motion vector refinement to derive motion vector difference values; applying at least one of the motion vector difference values to the initial motion vector to determine a refined motion vector for the current block; and decoding the current block using the refined motion vector.

Figure 15:
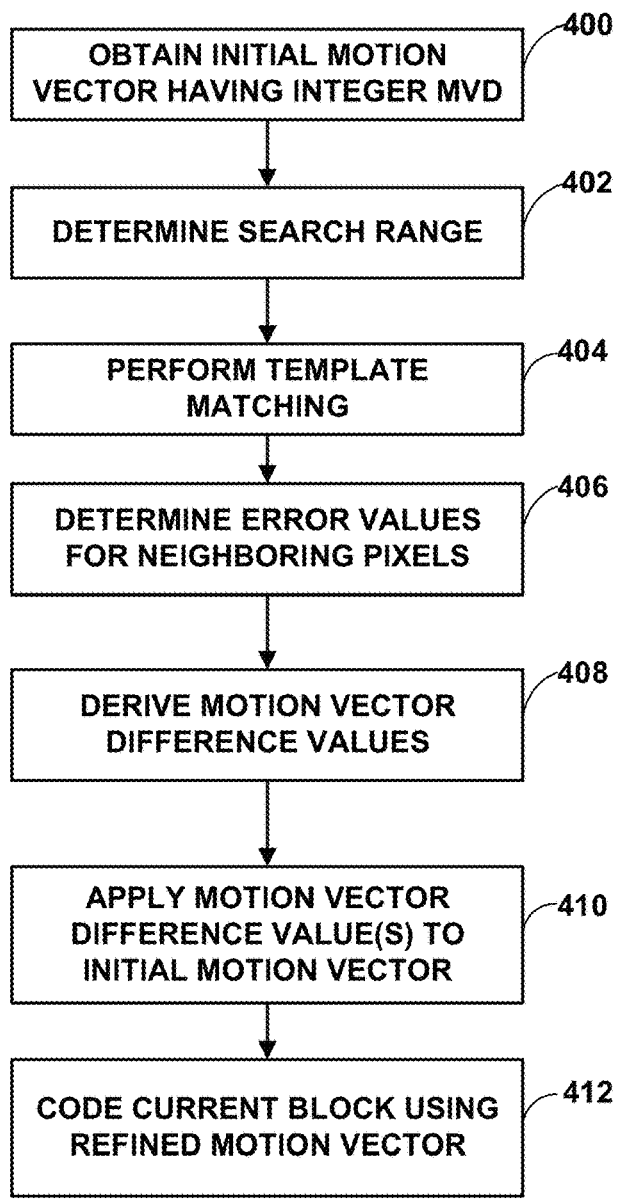
FIG. 15 is a flowchart illustrating an example method of encoding or decoding video data according to the techniques of this disclosure.

FIG. 15 is a flowchart illustrating an example method of encoding or decoding video data according to the techniques of this disclosure. The method of FIG. 15 is explained with respect to video decoder 300 of FIGS. 1 and 12. Other devices, such as video encoder 200 of FIGS. 1 and 11, may also be configured to perform this or a similar method.

Initially, video decoder 300 may obtain an initial motion vector having an integer-precision motion vector difference (MVD) value (400) for a current block. Video decoder 300 may decode data representing the initial motion vector. In some examples, video decoder 300 may refine decoded data representing a motion vector using bilateral matching, and the resulting motion vector may be the initial motion vector. In examples where video encoder 200 performs the method, video encoder 200 may obtain the initial motion vector through a search process performed by, e.g., motion estimation unit 222 as discussed above.

Video decoder 300 may then determine a search range (402), where the search range is around a reference area identified by the initial motion vector in a reference picture. Video decoder 300 may then perform a template matching search process (404) in the search range to identify a best matching region.

Video decoder 300 may then determine error values for neighboring pixels to the best matching region (406). Video decoder 300 may use the error values to perform a model-based fractional-pixel motion vector refinement to derive motion vector difference values (408). Video decoder 300 may then apply the motion vector difference values to the initial motion vector to obtain a refined motion vector (410). Video decoder 300 may then decode the current block using the refined motion vector (412). In examples where video encoder 200 performs the method, video encoder 200 may both encode and decode the current block using the refined motion vector.

In this manner, the method of FIG. 15 represents an example of a method of decoding video data including determining an initial motion vector for a current block of video data, the initial motion vector having integer-motion vector difference (MVD) precision; determining a search range around a reference area identified by the initial motion vector in a reference picture; performing a template matching search process in the search range to identify a best matching region; determining error values for neighboring pixels to the best matching region; using the error values for the neighboring pixels to perform a model-based fractional-pixel motion vector refinement to derive motion vector difference values; applying at least one of the motion vector difference values to the initial motion vector to determine a refined motion vector for the current block; and decoding the current block using the refined motion vector.

Various examples of the techniques of this disclosure are summarized in the following clauses:

Clause 1: A method of decoding video data, the method comprising: decoding data representing an initial motion vector for a current block of video data, the initial motion vector having integer-motion vector difference (MVD) precision; determining a search range around a reference area identified by the initial motion vector in a reference picture; performing a template matching search process in the search range to identify a best matching region; determining error values for neighboring pixels to the best matching region; using the error values for the neighboring pixels to perform a model-based fractional-pixel motion vector refinement to derive motion vector difference values; applying at least one of the motion vector difference values to the initial motion vector to determine a refined motion vector for the current block; and decoding the current block using the refined motion vector.

Clause 2: The method of clause 1, wherein the motion vector difference values include a horizontal motion vector difference value and a vertical motion vector difference value.

Clause 3: The method of any of clauses 1 and 2, wherein applying the at least one of the motion vector difference values comprises applying all of the motion vector difference values.

Clause 4: The method of any of clauses 1 and 2, wherein applying the at least one of the motion vector difference values comprises: determining that an error value for the best snatching region is not equal to zero; and in response to determining that an absolute value of a difference between a component of the initial motion vector and a corresponding motion vector difference value for the component is less than a corresponding search region value for the component, applying the motion vector difference value for the component to the component.

Clause 5: The method of any of clauses 1 and 2, wherein applying the at least one of the motion vector difference values comprises, in response to determining at least one of that an error value for the best matching region is equal to zero or that an absolute value of a difference between a component of the initial motion vector and a corresponding motion vector difference value for the component is greater than or equal to a corresponding search region value for the component, preventing application of the motion vector difference value for the component to the component.

Clause 6: The method of any of clauses 1-5, wherein performing the model-based fractional-pixel motion vector refinement comprises performing the model-based fractional-pixel motion vector refinement in response to determining one or more of 1) that the initial motion vector was refined using bilateral matching or decoder-side motion vector (DMVR) refinement, 2) that the refined motion vector will be further refined using bilateral matching or DMVR, or 3) each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 7: The method of any of clauses 1-5, wherein performing the model-based fractional-pixel motion vector refinement comprises performing the model-based fractional-pixel motion vector refinement in response to determining one or more of 1) that the initial motion vector was not refined using bilateral matching or decoder-side motion vector (DMVR) refinement, 2) that the refined motion vector will not be further refined using bilateral matching or DMVR, or 3) at least one of the following is not true: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 8: The method of any of clauses 1-7, wherein the motion vector difference values comprise a horizontal motion vector difference ($\Delta x$) and a vertical motion vector difference ($\Delta y$), wherein the error values for the neighboring pixels comprise $E_{x,y}$ values, wherein determining the error values comprises calculating $E_{x,y}=A(x-\Delta x)^2+B(y-\Delta y)^2+C$, and wherein performing the model-based fractional-pixel motion vector refinement comprises: calculating $\Delta x$ according to $s*floor((\alpha(E_{0,-1}-E_{0,1})/(2(E_{-1,0}+E_{1,0}2E_{0,0})))$; and calculating $\Delta y$ according to $s*floor((\alpha(E_{0,-1}-E_{0,1})/(2(E_{0,-1}+E_{0,1}-2E_{0,0})))$, wherein $\alpha$ is an integer scaling factor introduced to represent ($\Delta x, \Delta y$) in a certain fractional-pel precision, and wherein s is a scaling value.

Clause 9: The method of clause 8, further comprising determining a value for a according to an adaptive motion vector resolution (AMVR) mode for the current block.

Clause 10: The method of any of clauses 8 and 9, further comprising determining a value for $\alpha$ according to whether a half-pixel interpolation filter is used.

Clause 11: The method of any of clauses 9 and 10, wherein determining the value for a comprises determining that the value for $\alpha$ is equal to 0 or 1 when the AMVR mode is one of full-pixel, 2-pixel, 4-pixel, or more than 4-pixel.

Clause 12: The method of any of clauses 9-11, wherein determining the value for a comprises determining that the value for $\alpha$ is equal to 2 when the AMVR mode is half-pixel or when a half-pixel interpolation filter is used.

Clause 13: The method of any of clauses 9-12, wherein determining the value for a comprises determining that the value for $\alpha$ is equal to 4 when the AMVR mode is quarter-pixel.

Clause 14: The method of any of clauses 9-13, wherein determining the value for a comprises determining that the value for $\alpha$ is equal to 8 when the AMVR mode is 1/8 pixel.

Clause 15: The method of any of clauses 9-14, wherein determining the value for a comprises determining that the value for $\alpha$ is equal to 16 when the AMVR mode is 1/16-pixel.

Clause 16: The method of any of clauses 9-15, wherein determining the value for $\alpha$ comprises determining that the value for $\alpha$ is equal to N when the AMVR mode is 1/N-pixel.

Clause 17: The method of any of clauses 9-16, further comprising calculating a value for s as being equal to 16/$\alpha$.

Clause 18: The method of any of clauses 9-16, further comprising calculating a value for s as being equal to M/$\alpha$, wherein M is a motion vector storage precision.

Clause 19: The method of any of clauses 9-16, wherein when the AMVR mode is half-pixel: performing the template matching search process comprises performing the template matching search process at full-pixel motion vector difference precision, and determining the value for $\alpha$ comprises determining that the value for $\alpha$ is equal to 2; the method further comprising determining a value for s as being equal to 8.

Clause 20: The method of any of clauses 9-16, wherein when the AMVR mode is quarter-pixel: performing the template matching search process comprises performing the template matching search process at full-pixel motion vector difference precision, and determining the value for $\alpha$ comprises determining that the value for $\alpha$ is equal to 4; the method further comprising determining a value for s as being equal to 4.

Clause 21: The method of any of clauses 9-16, wherein when the AMVR mode is quarter-pixel: performing the template matching search process comprises performing the template matching search process at full-pixel motion vector difference precision, and determining the value for $\alpha$ comprises determining that the value for $\alpha$ is equal to 2; the method further comprising determining a value for s as being equal to 4.

Clause 22: The method of any of clauses 9-16, wherein when the AMVR mode is 1/16-pixel: performing the template matching search process comprises performing the template matching search process at full-pixel motion vector difference precision, and determining the value for $\alpha$ comprises determining that the value for $\alpha$ is equal to 2; the method further comprising determining a value for s as being equal to 1.

Clause 23: The method of any of clauses 9-16, wherein when the AMVR mode is 1/16-pixel: performing the template matching search process comprises performing the template matching search process at full-pixel motion vector difference precision, and determining the value for $\alpha$ comprises determining that the value for $\alpha$ is equal to 8; the method further comprising determining a value for s as being equal to 1.

Clause 24: The method of any of clauses 9-16, wherein when the AMVR mode is 1/16-pixel: performing the template matching search process comprises performing the template matching search process at full-pixel motion vector difference precision and at half-pixel motion vector difference precision, and determining the value for $\alpha$ comprises determining that the value for $\alpha$ is equal to 4; the method further comprising determining a value for s as being equal to 1.

Clause 25: The method of any of clauses 9-16, wherein when the AMVR mode is 1/16-pixel: performing the template matching search process comprises performing the template matching search process at full-pixel motion vector difference precision, at half-pixel motion vector difference precision, and at quarter-pixel motion vector difference precision, and determining the value for $\alpha$ comprises determining that the value for $\alpha$ is equal to 2; the method further comprising determining a value for s as being equal to 1.

Clause 26: The method of any of clauses 1-25, wherein the current block is bi-predicted, the initial motion vector comprises a first initial motion vector, and the refined motion vector comprises a first refined motion vector, the method further comprising refining a second initial motion vector for the current block using the first refined motion vector.

Clause 27: The method of clause 26, wherein the first initial motion vector is associated with reference picture list 0.

Clause 28: The method of clause 26, wherein the first initial motion vector is associated with reference picture list 1.

Clause 29: The method of clause 26, wherein the first initial motion vector is associated with reference picture list x, the method further comprising determining that x is equal to 1 when data indicates that motion vector difference values for reference picture list 1 are forced to be equal to zero and data for syntax elements for motion vector difference values for reference picture list 1 are not decoded.

Clause 30: The method of clause 26, wherein the first initial motion vector is associated with reference picture list x, the method further comprising determining that x is equal to 1 when data indicates that motion vector difference values for reference picture list 1 are not forced to be equal to zero and data for syntax elements for motion vector difference values for reference picture list 1 are decoded.

Clause 31: The method of clause 26, wherein the first initial motion vector is associated with reference picture list x, the method further comprising determining a value for x as being either 0 or 1 according to TM costs of motion vectors for reference picture list 0 and reference picture list 1.

Clause 32: The method of clause 31, wherein determining the value for x comprises determining that x is equal to 0 when the TM cost of the motion vector for reference picture list 0 is lower than the TM cost of the motion vector for reference picture list 1.

Clause 33: The method of clause 31, wherein determining the value for x comprises determining that x is equal to 0 when the TM cost of the motion vector for reference picture list 1 is lower than the TM cost of the motion vector for reference picture list 0.

Clause 34: The method of any of clauses 1-33, further comprising refining the decoded data representing the motion vector using bilateral matching to form the initial motion vector.

Clause 35: The method of any of clauses 1-33, further comprising refining the refined motion vector using bilateral matching to form a further refined motion vector, wherein decoding the current block comprises decoding the current block using the further refined motion vector.

Clause 36: The method of any of clauses 34 and 35, wherein bilateral matching and template matching share the same search range.

Clause 37: The method of any of clauses 1-36, wherein performing the template matching search process comprises performing the template matching search process after determining that an adaptive motion vector resolution (AMVR) mode is not 4-pixel mode.

Clause 38: The method of any of clauses 1-36, wherein performing the template matching search process comprises performing the template matching search process after determining that an adaptive motion vector resolution (AMVR) mode is greater than two-pixel mode.

Clause 39: The method of any of clauses 1-38, further comprising encoding the current block prior to decoding the current block.

Clause 40: A device for decoding video data, the device comprising one or more means for performing the method of any of clauses 1-39.

Clause 41: The device of clause 40, wherein the one or more means comprise one or more processors implemented in circuitry.

Clause 42: The device of any of clauses 40 and 41, further comprising a display configured to display the decoded video data.

Clause 43: The device of any of clauses 40-42, wherein the device comprises one or more of a camera, a computer, a mobile device, a broadcast receiver device, or a set-top box.

Clause 44: The device of clause 40-43, further comprising a memory configured to store the video data.

Clause 45: A computer-readable storage medium having stored thereon instructions that, when executed, cause a processor of a device for decoding video data to perform the method of any of clauses 1-39.

Clause 46: A device for decoding video data, the device comprising: means for decoding data representing an initial motion vector for a current block of video data, the initial motion vector having integer-motion vector difference (MVD) precision; means for determining a search range around a reference area identified by the initial motion vector in a reference picture; means for performing a template matching search process in the search range to identify a best matching region; means for determining error values for neighboring pixels to the best matching region; means for using the error values for the neighboring pixels to perform a model-based fractional-pixel motion vector refinement to derive motion vector difference values; means for applying at least one of the motion vector difference values to the initial motion vector to determine a refined motion vector for the current block; and means for decoding the current block using the refined motion vector.

Clause 47: A method of decoding video data, the method comprising: decoding data representing an initial motion vector for a current block of video data, the initial motion vector having integer-motion vector difference (MVD) precision; determining a search range around a reference area identified by the initial motion vector in a reference picture; performing a template matching search process in the search range to identify a best matching region; determining error values for neighboring pixels to the best matching region; using the error values for the neighboring pixels to perform a model-based fractional-pixel motion vector refinement to derive motion vector difference values; applying at least one of the motion vector difference values to the initial motion vector to determine a refined motion vector for the current block, and decoding the current block using the refined motion vector.

Clause 48: The method of clause 47, wherein the motion vector difference values include a horizontal motion vector difference value and a vertical motion vector difference value.

Clause 49: The method of clause 47, wherein applying the at least one of the motion vector difference values comprises applying all of the motion vector difference values.

Clause 50: The method of clause 47, wherein applying the at least one of the motion vector difference values comprises: determining that an error value for the best matching region is not equal to zero; and in response to determining that an absolute value of a difference between a component of the initial motion vector and a corresponding motion vector difference value for the component is less than a corresponding search region value for the component, applying the motion vector difference value for the component to the component.

Clause 51: The method of clause 47, wherein applying the at least one of the motion vector difference values comprises, in response to determining at least one of that an error value for the best matching region is equal to zero or that an absolute value of a difference between a component of the initial motion vector and a corresponding motion vector difference value for the component is greater than or equal to a corresponding search region value for the component, preventing application of the motion vector difference value for the component to the component.

Clause 52: The method of clause 47, wherein performing the model-based fractional-pixel motion vector refinement comprises performing the model-based fractional-pixel motion vector refinement in response to determining each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 53: The method of clause 47, wherein performing the model-based fractional-pixel motion vector refinement comprises performing the model-based fractional-pixel motion vector refinement in response to determining at least one of 1) that the initial motion vector was refined using bilateral matching or decoder-side motion vector (DMVR) refinement, or 2) that the refined motion vector will be further refined using bilateral matching or DMVR.

Clause 54: The method of clause 47, wherein performing the model-based fractional-pixel motion vector refinement comprises performing the model-based fractional-pixel motion vector refinement in response to determining one or more of 1) that the initial motion vector was not refined using bilateral matching or decoder-side motion vector (DMVR) refinement, 2) that the refined motion vector will not be further refined using bilateral matching or DMVR, or 3) at least one of the following is not true: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 55: The method of clause 47, wherein the motion vector difference values comprise a horizontal motion vector difference ($\Delta x$) and a vertical motion vector difference ($\Delta y$), wherein the error values for the neighboring pixels comprise $E_{x,y}$ values, wherein determining the error values comprises calculating $E_{x,y}=A(x-\Delta x)^2+B(y-\Delta y)^2+C$, and wherein performing the model-based fractional-pixel motion vector refinement comprises: calculating $\Delta x$ according to s*floor$((\alpha(E_{0,-1}-E_{0,1}))/(2(E_{-1,0}+E_{1,0}2E_{0,0})))$; and calculating $\Delta y$ according to s*floor$((\alpha(E_{0,-1}-E_{0,1}))/(2(E_{0,-1}+E_{0,1}-2E_{0,0})))$, wherein $\alpha$ is an integer scaling factor introduced to represent ($\Delta x$, $\Delta y$) in a certain fractional-pel precision, and wherein s is a scaling value.

Clause 56: The method of clause 55, further comprising determining a value for a as being equal to 16 regardless of whether a half-pixel interpolation filter is used.

Clause 57: The method of clause 55, further comprising determining a value for a according to an adaptive motion vector resolution (AMVR) mode for the current block.

Clause 58: The method of clause 55, further comprising determining a value for a according to whether a half-pixel interpolation filter is used.

Clause 59: The method of clause 47, wherein the current block is bi-predicted, the initial motion vector comprises a first initial motion vector, and the refined motion vector comprises a first refined motion vector, the method further comprising refining a second initial motion vector for the current block using the first refined motion vector.

Clause 60: The method of clause 47, further comprising refining the decoded data representing the motion vector using bilateral matching to form the initial motion vector.

Clause 61: The method of clause 47, further comprising refining the refined motion vector using bilateral matching to form a further refined motion vector, wherein decoding the current block comprises decoding the current block using the further refined motion vector.

Clause 62: The method of clause 47, wherein performing the template matching search process comprises performing the template matching search process after determining that an adaptive motion vector resolution (AMVR) mode is not 4-pixel mode.

Clause 63: The method of clause 47, further comprising encoding the current block prior to decoding the current block.

Clause 64: A device for decoding video data, the device comprising: a memory configured to store video data; and one or more processors implemented in circuitry and configured to: decode data representing an initial motion vector for a current block of the video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

Clause 65: The device of clause 64, wherein to apply the at least one of the motion vector difference values, the one or more processors are configured to: determine that an error value for the best matching region is not equal to zero; and in response to determining that an absolute value of a difference between a component of the initial motion vector and a corresponding motion vector difference value for the component is less than a corresponding search region value for the component, apply the motion vector difference value for the component to the component.

Clause 66: The device of clause 64, wherein the one or more processors are configured to perform the model-based fractional-pixel motion vector refinement in response to determining each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 67: The device of clause 64, wherein the motion vector difference values comprise a horizontal motion vector difference ($\Delta x$) and a vertical motion vector difference ($\Delta y$), wherein the error values for the neighboring pixels comprise $E_{x,y}$ values, wherein to determine the error values, the one or more processors are configured to calculate $E_{x,y} = A(x-\Delta x)^2 + B(y-\Delta y)^2 + C$, and wherein to perform the model-based fractional-pixel motion vector refinement, the one or more processors are configured to: calculate $\Delta x$ according to $s*\text{floor}((\alpha(E_{0,-1}-E_{0,1}))/(2(E_{-1,0}+E_{1,0}2E_{0,0})))$; and calculating $\Delta y$ according to $s*\text{floor}((\alpha(E_{0,-1}-E_{0,1}))/(2(E_{0,-1}+E_{0,1}-2E_{0,0})))$, and determine a value for $\alpha$ as being equal to 16 regardless of whether a half-pixel interpolation filter is used, wherein $\alpha$ is an integer scaling factor introduced to represent ($\Delta x$, $\Delta y$) in a certain fractional-pel precision, and wherein s is a scaling value.

Clause 68: The device of clause 64, wherein the one or more processors are further configured to refine the decoded data representing the motion vector using bilateral matching to form the initial motion vector.

Clause 69: The device of clause 64, wherein the one or more processors are further configured to refine the refined motion vector using bilateral matching to form a further refined motion vector, and wherein the one or more processors are configured to decode the current block using the further refined motion vector.

Clause 70: The device of clause 64, wherein the one or more processors are configured to perform the template matching search process after determining that an adaptive motion vector resolution (AMVR) mode is not 4-pixel mode.

Clause 71: The device of clause 64, further comprising a display configured to display the decoded video data.

Clause 72: The device of clause 64, wherein the device comprises one or more of a camera, a computer, a mobile device, a broadcast receiver device, or a set-top box.

Clause 73: A computer-readable storage medium having stored thereon instructions that, when executed, cause a processor of a device for decoding video data to: decode data representing an initial motion vector for a current block of video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

Clause 74: The computer-readable storage medium of clause 73, wherein the instructions that cause the processor to apply the at least one of the motion vector difference values comprise instructions that cause the processor to: determine that an error value for the best matching region is not equal to zero; and in response to determining that an absolute value of a difference between a component of the initial motion vector and a corresponding motion vector difference value for the component is less than a corresponding search region value for the component, apply the motion vector difference value for the component to the component.

Clause 75: The computer-readable storage medium of clause 73, wherein the instructions that cause the processor to perform the model-based fractional-pixel motion vector refinement comprise instructions that cause the processor to perform the model-based fractional-pixel motion vector refinement in response to determining each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 76: The computer-readable storage medium of clause 73, wherein the motion vector difference values comprise a horizontal motion vector difference ($\Delta x$) and a vertical motion vector difference ($\Delta y$), wherein the error values for the neighboring pixels comprise $E_{x,y}$ values, wherein the instructions that cause the processor to determine the error values comprise instructions that cause the processor to calculate $E_{x,y} = A(x-\Delta x)^2 + B(y-\Delta y)^2 + C$, and wherein the instructions that cause the processor to perform the model-based fractional-pixel motion vector refinement comprise instructions that cause the processor to: calculate $\Delta x$ according to $s*\text{floor}((\alpha(E_{0,-1}-E_{0,1}))/(2(E_{-1,0}+E_{1,0}-2E_{0,0})))$; calculate $\Delta y$ according to $s*\text{floor}((\alpha(E_{0,-1}-E_{0,1}))/(2(E_{0,-1}+E_{0,1}-2E_{0,0})))$, and determine a value for a as being equal to 16 regardless of whether a half-pixel interpolation filter is used, wherein $\alpha$ is an integer scaling factor introduced to represent ($\Delta x$, $\Delta y$) in a certain fractional-pel precision, and wherein s is a scaling value.

Clause 77: The computer-readable storage medium of clause 73, further comprising instructions that cause the processor to refine the decoded data representing the motion vector using bilateral matching to form the initial motion vector.

Clause 78: The computer-readable storage medium of clause 73, further comprising instructions that cause the processor to refine the refined motion vector using bilateral matching to form a further refined motion vector, wherein the instructions that cause the processor to decode the current block comprise instructions that cause the processor to decode the current block using the further refined motion vector.

Clause 79: The computer-readable storage medium of clause 73, wherein the instructions that cause the processor to perform the template matching search process comprise instructions that cause the processor to perform the template matching search process after determining that an adaptive motion vector resolution (AMVR) mode is not 4-pixel mode.

Clause 80: A device for decoding video data, the device comprising: means for decoding data representing an initial motion vector for a current block of video data, the initial motion vector having integer-motion vector difference (MVD) precision; means for determining a search range around a reference area identified by the initial motion vector in a reference picture; means for performing a template matching search process in the search range to identify a best matching region; means for determining error values for neighboring pixels to the best matching region; means for using the error values for the neighboring pixels to perform a model-based fractional-pixel motion vector refinement to derive motion vector difference values; means for applying at least one of the motion vector difference values to the initial motion vector to determine a refined motion vector for the current block; and means for decoding the current block using the refined motion vector.

Clause 81: A method of decoding video data, the method comprising: decoding data representing an initial motion vector for a current block of video data, the initial motion vector having integer-motion vector difference (MVD) precision; determining a search range around a reference area identified by the initial motion vector in a reference picture: performing a template matching search process in the search range to identify a best matching region; determining error values for neighboring pixels to the best matching region; using the error values for the neighboring pixels to perform a model-based fractional-pixel motion vector refinement to derive motion vector difference values; applying at least one of the motion vector difference values to the initial motion vector to determine a refined motion vector for the current block; and decoding the current block using the refined motion vector.

Clause 82: The method of clause 81, wherein the motion vector difference values include a horizontal motion vector difference value and a vertical motion vector difference value.

Clause 83: The method of any of clauses 81 and 82, wherein applying the at least one of the motion vector difference values comprises applying all of the motion vector difference values.

Clause 84: The method of any of clauses 81 and 82, wherein applying the at least one of the motion vector difference values comprises: determining that an error value for the best matching region is not equal to zero; and in response to determining that an absolute value of a difference between a component of the initial motion vector and a corresponding motion vector difference value for the component is less than a corresponding search region value for the component, applying the motion vector difference value for the component to the component.

Clause 85: The method of any of clauses 81 and 82, wherein applying the at least one of the motion vector difference values comprises, in response to determining at least one of that an error value for the best matching region is equal to zero or that an absolute value of a difference between a component of the initial motion vector and a corresponding motion vector difference value for the component is greater than or equal to a corresponding search region value for the component, preventing application of the motion vector difference value for the component to the component.

Clause 86: The method of any of clauses 81-85, wherein performing the model-based fractional-pixel motion vector refinement comprises performing the model-based fractional-pixel motion vector refinement in response to determining each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 87: The method of any of clauses 81-85, wherein performing the model-based fractional-pixel motion vector refinement comprises performing the model-based fractional-pixel motion vector refinement in response to determining at least one of 1) that the initial motion vector was refined using bilateral matching or decoder-side motion vector (DMVR) refinement, or 2) that the refined motion vector will be further refined using bilateral matching or DMVR.

Clause 88: The method of any of clauses 81-85, wherein performing the model-based fractional-pixel motion vector refinement comprises performing the model-based fractional-pixel motion vector refinement in response to determining one or more of 1) that the initial motion vector was not refined using bilateral matching or decoder-side motion vector (DMVR) refinement, 2) that the refined motion vector will not be further refined using bilateral matching or DMVR, or 3) at least one of the following is not true: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 89: The method of any of clauses 81-88, wherein the motion vector difference values comprise a horizontal motion vector difference ($\Delta x$) and a vertical motion vector difference ($\Delta y$), wherein the error values for the neighboring pixels comprise $E_{x,y}$ values, wherein determining the error values comprises calculating $E_{x,y} = A(x-\Delta x)^2 + B(y-\Delta y)^2 + C$, and wherein performing the model-based fractional-pixel motion vector refinement comprises: calculating $\Delta x$ according to $s*floor((\alpha(E_{0,-1}-E_{0,1}))/(2(E_{-1,0}+E_{1,0}2E_{0,0})))$; and calculating $\Delta y$ according to $s*floor((\alpha(E_{0,-1}-E_{0,1}))/(2(E_{0,-1}+E_{0,1}-2E_{0,0})))$, wherein $\alpha$ is an integer scaling factor introduced to represent ($\Delta x$, $\Delta y$) in a certain fractional-pel precision, and wherein s is a scaling value.

Clause 90: The method of clause 89, further comprising determining a value for a as being equal to 16 regardless of whether a half-pixel interpolation filter is used.

Clause 91: The method of any of clauses 89 and 90, further comprising determining a value for a according to an adaptive motion vector resolution (AMVR) mode for the current block.

Clause 92: The method of any of clauses 89 and 91, further comprising determining a value for a according to whether a half-pixel interpolation filter is used.

Clause 93: The method of any of clauses 81-92, wherein the current block is bi-predicted, the initial motion vector comprises a first initial motion vector, and the refined motion vector comprises a first refined motion vector, the method further comprising refining a second initial motion vector for the current block using the first refined motion vector.

Clause 94: The method of any of clauses 81-93, further comprising refining the decoded data representing the motion vector using bilateral matching to form the initial motion vector.

Clause 95: The method of any of clauses 81-93, further comprising refining the refined motion vector using bilateral matching to form a further refined motion vector, wherein decoding the current block comprises decoding the current block using the further refined motion vector.

Clause 96: The method of any of clauses 81-95, wherein performing the template matching search process comprises performing the template matching search process after determining that an adaptive motion vector resolution (AMVR) mode is not 4-pixel mode.

Clause 97: The method of any of clauses 81-96, further comprising encoding the current block prior to decoding the current block.

Clause 98: A device for decoding video data, the device comprising: a memory configured to store video data; and one or more processors implemented in circuitry and configured to: decode data representing an initial motion vector for a current block of the video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

Clause 99: The device of clause 98, wherein to apply the at least one of the motion vector difference values, the one or more processors are configured to: determine that an error value for the best matching region is not equal to zero; and in response to determining that an absolute value of a difference between a component of the initial motion vector and a corresponding motion vector difference value for the component is less than a corresponding search region value for the component, apply the motion vector difference value for the component to the component.

Clause 100: The device of any of clauses 98 and 99, wherein the one or more processors are configured to perform the model-based fractional-pixel motion vector refinement in response to determining each of that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 101: The device of any of clauses 98-100, wherein the motion vector difference values comprise a horizontal motion vector difference ($\Delta x$) and a vertical motion vector difference ($\Delta y$), wherein the error values for the neighboring pixels comprise $E_{x,y}$ values, wherein to determine the error values, the one or more processors are configured to calculate $E_{x,y} = A(x-\Delta x)^2 + B(y-\Delta y)^2 + C$, and wherein to perform the model-based fractional-pixel motion vector refinement, the one or more processors are configured to: calculate $\Delta x$ according to $s*floor((\alpha(E_{-1,0}-E_{1,0}))/(2(E_{-1,0}+E_{1,0}-2E_{0,0})))$; calculate $\Delta y$ according to $s*floor((\alpha(E_{0,-1}-E_{0,1}))/(2(E_{0,-1}+E_{0,1}-2E_{0,0})))$; and determine a value for a as being equal to 16 regardless of whether a half-pixel interpolation filter is used, wherein $\alpha$ is an integer scaling factor introduced to represent ($\Delta x$, $\Delta y$) in a certain fractional-pel precision, and wherein s is a scaling value.

Clause 102: The device of any of clauses 98-101, wherein the one or more processors are further configured to refine the decoded data representing the motion vector using bilateral matching to form the initial motion vector.

Clause 103: The device of any of clauses 98-102, wherein the one or more processors are further configured to refine the refined motion vector using bilateral matching to form a further refined motion vector, and wherein the one or more processors are configured to decode the current block using the further refined motion vector.

Clause 104: The device of any of clauses 98-103, wherein the one or more processors are configured to perform the template matching search process after determining that an adaptive motion vector resolution (AMVR) mode is not 4-pixel mode.

Clause 105: The device of any of clauses 98-104, further comprising a display configured to display the decoded video data.

Clause 106: The device of any of clauses 98-105, wherein the device comprises one or more of a camera, a computer, a mobile device, a broadcast receiver device, or a set-top box.

Clause 107: A computer-readable storage medium having stored thereon instructions that, when executed, cause a processor of a device for decoding video data to: decode data representing an initial motion vector for a current block of video data, the initial motion vector having integer-motion vector difference (MVD) precision; determine a search range around a reference area identified by the initial motion vector in a reference picture; perform a template matching search process in the search range to identify a best matching region; determine error values for neighboring pixels to the best matching region; use the error values for the neighboring pixels to perform a model-based fractional-pixel motion vector refinement to derive motion vector difference values; apply at least one of the motion vector difference values to the initial motion vector to determine a refined motion vector for the current block; and decode the current block using the refined motion vector.

Clause 108: The computer-readable storage medium of clause 107, wherein the instructions that cause the processor to apply the at least one of the motion vector difference values comprise instructions thaw cause the processor to: determine that an error value for the best matching region is not equal to zero; and in response to determining that an absolute value of a difference between a component of the initial motion vector and a corresponding motion vector difference value for the component is less than a corresponding search region value for the component, apply the motion vector difference value for the component to the component.

Clause 109: The computer-readable storage medium of any of clauses 107 and 108, wherein the instructions that cause the processor to perform the model-based fractional-pixel motion vector refinement comprise instructions that cause the processor to perform the model-based fractional-pixel motion vector refinement in response to determining each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

Clause 110: The computer-readable storage medium of any of clauses 107-109, wherein the motion vector difference values comprise a horizontal motion vector difference ($\Delta x$) and a vertical motion vector difference ($\Delta y$), wherein the error values for the neighboring pixels comprise $E_{x,y}$ values, wherein the instructions that cause the processor to determine the error values comprise instructions that cause the processor to calculate $E_{x,y}=A(x-\Delta x)^2+B(y-\Delta y)^2+C$, and wherein the instructions that cause the processor to perform the model-based fractional-pixel motion vector refinement comprise instructions that cause the processor to: calculate $\Delta x$ according to $s*floor((\alpha(E_{-1,0}-E_{1,0}))/(2(E_{-1,0}+E_{1,0}-2E_{0,0})))$; calculate $\Delta y$ according to $s*floor((\alpha(E_{0,-1}-E_{0,1}))/(2(E_{0,-1}+E_{0,1}-2E_{0,0})))$; and determine a value for $\alpha$ as being equal to 16 regardless of whether a half-pixel interpolation filter is used, wherein $\alpha$ is an integer scaling factor introduced to represent ($\Delta Y$, $\Delta y$) in a certain fractional-pel precision, and wherein s is a scaling value.

Clause 111: The computer-readable storage medium of any of clauses 107-110, further comprising instructions that cause the processor to refine the decoded data representing the motion vector using bilateral matching to form the initial motion vector.

Clause 112: The computer-readable storage medium of any of clauses 107-111, further comprising instructions that cause the processor to refine the refined motion vector using bilateral matching to form a further refined motion vector, wherein the instructions that cause the processor to decode the current block comprise instructions that cause the processor to decode the current block using the further refined motion vector.

Clause 113: The computer-readable storage medium of any of clauses 107-112, wherein the instructions that cause the processor to perform the template matching search process comprise instructions that cause the processor to perform the template matching search process after determining that an adaptive motion vector resolution (AMVR) mode is not 4-pixel mode.

Clause 114: A device for decoding video data, the device comprising: means for decoding data representing an initial motion vector for a current block of video data, the initial motion vector having integer-motion vector difference (MVD) precision; means for determining a search range around a reference area identified by the initial motion vector in a reference picture; means for performing a template matching search process in the search range to identify a best matching region; means for determining error values for neighboring pixels to the best matching region; means for using the error values for the neighboring pixels to perform a model-based fractional-pixel motion vector refinement to derive motion vector difference values; means for applying at least one of the motion vector difference values to the initial motion vector to determine a refined motion vector for the current block; and means for decoding the current block using the refined motion vector.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining an initial motion vector for a current block of video data, the initial motion vector having integer-motion vector difference (MVD) precision;
   determining a search range around a reference area identified by the initial motion vector in a reference picture;
   performing a template matching search process using integer-precision samples in the search range to identify a best matching region, without using fractional samples in the search range during the template matching search process;
   determining error values for neighboring pixels to the best matching region, wherein the motion vector difference values comprise a horizontal motion vector difference ($\Delta x$) and a vertical motion vector difference ($\Delta y$), wherein the error values for the neighboring pixels comprise $E_{x,y}$ values, wherein determining the error values comprises calculating $E_{x,y}=A(x-\Delta x)^2+B(y-\Delta y)^2+C$, and wherein performing the model-based fractional-pixel motion vector refinement comprises:
   calculating $\Delta x$ according to $s*floor((\alpha(E_{-1,0}-E_{1,0}))/(2(E_{-1,0}+E_{1,0}-2E_{0,0})))$; and
   calculating $\Delta y$ according to $s*floor((\alpha(E_{0,-1}-E_{0,1}))/(2(E_{0,-1}+E_{0,1}-2E_{0,0})))$,
   wherein $\alpha$ is an integer scaling factor introduced to represent ($\Delta x$, $\Delta y$) in a certain fractional-pel precision, and wherein s is a scaling value;
   using the error values for the neighboring pixels to perform a model-based fractional-pixel motion vector refinement to derive motion vector difference values, at least one of the motion vector difference values including a non-zero fractional value;
   applying at least one of the motion vector difference values to the initial motion vector to determine a refined motion vector for the current block, the refined motion vector identifying a fractional sample position in the reference picture; and
   decoding the current block using the refined motion vector.

2. The method of claim 1, wherein the motion vector difference values include a horizontal motion vector difference value and a vertical motion vector difference value.

3. The method of claim 1, wherein applying the at least one of the motion vector difference values comprises applying all of the motion vector difference values.

4. The method of claim 1, wherein applying the at least one of the motion vector difference values comprises:
   determining that an error value for the best matching region is not equal to zero; and
   in response to determining that an absolute value of a difference between a component of the initial motion vector and a corresponding motion vector difference value for the component is less than a corresponding search region value for the component, applying the motion vector difference value for the component to the component.

5. The method of claim 1, wherein applying the at least one of the motion vector difference values comprises, in response to determining at least one of that an error value for the best matching region is equal to zero or that an absolute value of a difference between a component of the initial motion vector and a corresponding motion vector difference value for the component is greater than or equal to a corresponding search region value for the component, preventing application of the motion vector difference value for the component to the component.

6. The method of claim 1, wherein performing the model-based fractional-pixel motion vector refinement comprises performing the model-based fractional-pixel motion vector refinement in response to determining each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

7. The method of claim 1, wherein performing the model-based fractional-pixel motion vector refinement comprises performing the model-based fractional-pixel motion vector refinement in response to determining at least one of 1) that the initial motion vector was refined using bilateral matching or decoder-side motion vector (DMVR) refinement, or 2) that the refined motion vector will be further refined using bilateral matching or DMVR.

8. The method of claim 1, wherein performing the model-based fractional-pixel motion vector refinement comprises performing the model-based fractional-pixel motion vector refinement in response to determining one or more of 1) that the initial motion vector was not refined using bilateral matching or decoder-side motion vector (DMVR) refinement, 2) that the refined motion vector will not be further refined using bilateral matching or DMVR, or 3) at least one of the following is not true: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

9. The method of claim 1, further comprising determining a value for a as being equal to 16 regardless of whether a half-pixel interpolation filter is used.

10. The method of claim 1, further comprising determining a value for a according to an adaptive motion vector resolution (AMVR) mode for the current block.

11. The method of claim 1, further comprising determining a value for a according to whether a half-pixel interpolation filter is used.

12. The method of claim 1, wherein the current block is bi-predicted, the initial motion vector comprises a first initial motion vector, and the refined motion vector comprises a first refined motion vector, the method further comprising refining a second initial motion vector for the current block using the first refined motion vector.

13. The method of claim 1, further comprising refining data representing a motion vector using bilateral matching to form the initial motion vector.

14. The method of claim 1, further comprising refining the refined motion vector using bilateral matching to form a further refined motion vector, wherein decoding the current block comprises decoding the current block using the further refined motion vector.

15. The method of claim 1, wherein performing the template matching search process comprises performing the template matching search process after determining that an adaptive motion vector resolution (AMVR) mode is not 4-pixel mode.

16. The method of claim 1, wherein determining the initial motion vector comprises decoding data representing the initial motion vector.

17. The method of claim 1, further comprising encoding the current block prior to decoding the current block.

18. A device for decoding video data, the device comprising:
a memory configured to store video data; and
one or more processors implemented in circuitry and configured to:
determine an initial motion vector for a current block of the video data, the initial motion vector having integer-motion vector difference (MVD) precision;
determine a search range around a reference area identified by the initial motion vector in a reference picture;
perform a template matching search process using integer-precision samples in the search range to identify a best matching region, without using fractional samples in the search range during the template matching search process;
determine error values for neighboring pixels to the best matching region, wherein the motion vector difference values comprise a horizontal motion vector difference ($\Delta x$) and a vertical motion vector difference ($\Delta y$), wherein the error values for the neighboring pixels comprise $E_{x,y}$ values, wherein to determine the error values, the one or more processors are configured to calculate $E_{x,y} = A(x-\Delta x)^2 + B(y-\Delta y)^2 + C$, and wherein to perform the model-based fractional-pixel motion vector refinement, the one or more processors are configured to:
calculating $\Delta x$ according to $s*\text{floor}((\alpha(E_{-1,0}-E_{1,0}))/(2(E_{-1,0}+E_{1,0}-2E_{0,0})))$;
calculating $\Delta y$ according to $s*\text{floor}((\alpha(E_{0,-1}-E_{0,1}))/(2(E_{0,-1}+E_{0,1}-2E_{0,0})))$; and
determine a value for a as being equal to 16 regardless of whether a half-pixel interpolation filter is used, wherein $\alpha$ is an integer scaling factor introduced to represent ($\Delta x$, $\Delta y$) in a certain fractional-pel precision, and wherein s is a scaling value;
use the error values for the neighboring pixels to perform a model-based fractional-pixel motion vector refinement to derive motion vector difference values, at least one of the motion vector difference values including a non-zero fractional value;
apply at least one of the motion vector difference values to the initial motion vector to determine a refined motion vector for the current block, the refined motion vector identifying a fractional sample position in the reference picture; and
decode the current block using the refined motion vector.

19. The device of claim 18, wherein to apply the at least one of the motion vector difference values, the one or more processors are configured to:
determine that an error value for the best matching region is not equal to zero; and
in response to determining that an absolute value of a difference between a component of the initial motion vector and a corresponding motion vector difference value for the component is less than a corresponding search region value for the component, apply the motion vector difference value for the component to the component.

20. The device of claim 18, wherein the one or more processors are configured to perform the model-based fractional-pixel motion vector refinement in response to determining each of: that the initial motion vector is a coding unit (CU) level merge mode with bi-prediction motion vector, that a first reference picture for the current block has a display order value less than a display order value of a current picture including the current block, that a second reference picture for the current block has a display order value greater than the display order value of the current picture, that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal, that weighted prediction (WP) is not enabled for the current block, and that combined intra-inter prediction (CIIP) mode is not used for the current block.

21. The device of claim 18, wherein the one or more processors are further configured to refine the decoded data representing the motion vector using bilateral matching to form the initial motion vector.

22. The device of claim 18, wherein the one or more processors are further configured to refine the refined motion vector using bilateral matching to form a further refined motion vector, and wherein the one or more processors are configured to decode the current block using the further refined motion vector.

23. The device of claim 18, wherein the one or more processors are configured to perform the template matching search process after determining that an adaptive motion vector resolution (AMVR) mode is not 4-pixel mode.

24. The device of claim 18, further comprising a display configured to display the decoded video data.

25. The device of claim 18, wherein the device comprises one or more of a camera, a computer, a mobile device, a broadcast receiver device, or a set-top box.

26. A method of decoding video data, the method comprising:
determining an initial motion vector for a current block of video data, the initial motion vector having integer-motion vector difference (MVD) precision;
determining a search range around a reference area identified by the initial motion vector in a reference picture;
performing a template matching search process using integer-precision samples in the search range to identify a best matching region, without using fractional samples in the search range during the template matching search process;
determining error values for neighboring pixels to the best matching region;
using the error values for the neighboring pixels to perform a model-based fractional-pixel motion vector refinement to derive motion vector difference values, at least one of the motion vector difference values including a non-zero fractional value, wherein performing the model-based fractional-pixel motion vector refinement comprises performing the model-based fractional-pixel motion vector refinement in response to determining one or more of:
1) That the initial motion vector was not refined using bilateral matching or decoder-side motion vector (DMVR) refinement,
2) That the refined motion vector will not be further refined using bilateral matching or DMVR, or
3) At least one of the following is not true:
that the initial motion vector is a coding unit (CU) level merge mode with bi-prediction motion vector,
that a first reference picture for the current block has a display order value less than a display order value of a current picture including the current block,
that a second reference picture for the current block has a display order value greater than the display order value of the current picture,
that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal,
that weighted prediction (WP) is not enabled for the current block, or
that combined intra-inter prediction (CIIP) mode is not used for the current block;
applying at least one of the motion vector difference values to the initial motion vector to determine a refined motion vector for the current block, the refined motion vector identifying a fractional sample position in the reference picture; and
decoding the current block using the refined motion vector.

27. A device for decoding video data, the device comprising:
a memory configured to store video data; and
one or more processors implemented in circuitry and configured to:
determine an initial motion vector for a current block of the video data, the initial motion vector having integer-motion vector difference (MVD) precision;
determine a search range around a reference area identified by the initial motion vector in a reference picture;
perform a template matching search process using integer-precision samples in the search range to identify a best matching region, without using fractional samples in the search range during the template matching search process;
determine error values for neighboring pixels to the best matching region;
use the error values for the neighboring pixels to perform a model-based fractional-pixel motion vector refinement to derive motion vector difference values, at least one of the motion vector difference values including a non-zero fractional value, wherein to perform the model-based fractional-pixel motion vector refinement, the one or more processors is configured to perform the model-based fractional-pixel motion vector refinement in response to determining one or more of:
1) That the initial motion vector was not refined using bilateral matching or decoder-side motion vector (DMVR) refinement,
2) That the refined motion vector will not be further refined using bilateral matching or DMVR, or
3) At least one of the following is not true:
that the initial motion vector is a coding unit (CU) level merge mode with bi-prediction motion vector,
that a first reference picture for the current block has a display order value less than a display order value of a current picture including the current block,
that a second reference picture for the current block has a display order value greater than the display order value of the current picture,
that temporal distances between the current picture and the first reference picture and the second reference picture are equal, that the current block has more than 64 luma pixels, that a height of the current block is at least 8 luma pixels, that a width of the current block is at least 8 luma pixels, that weight values for bi-prediction with CU-level weight (BCW) are equal,
that weighted prediction (WP) is not enabled for the current block, or
that combined intra-inter prediction (CIIP) mode is not used for the current block;
apply at least one of the motion vector difference values to the initial motion vector to determine a refined motion vector for the current block, the refined motion vector identifying a fractional sample position in the reference picture; and
decode the current block using the refined motion vector.

* * * * *